(12) United States Patent
Nakata et al.

(10) Patent No.: US 8,488,431 B2
(45) Date of Patent: Jul. 16, 2013

(54) OPTICAL HEAD AND OPTICAL INFORMATION DEVICE

(75) Inventors: Hideki Nakata, Kyoto (JP); Hidenori Wada, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/391,110

(22) PCT Filed: Jun. 15, 2011

(86) PCT No.: PCT/JP2011/003404
§ 371 (c)(1),
(2), (4) Date: Feb. 17, 2012

(87) PCT Pub. No.: WO2011/161904
PCT Pub. Date: Dec. 29, 2011

(65) Prior Publication Data
US 2012/0147726 A1    Jun. 14, 2012

(30) Foreign Application Priority Data

Jun. 21, 2010  (JP) .................................. 2010-140080

(51) Int. Cl.
*G11B 7/00* (2006.01)
(52) U.S. Cl.
USPC .................... 369/112.01; 369/44.12; 369/118
(58) Field of Classification Search
USPC ............... 269/44.12, 44.24, 118, 112.01, 120
See application file for complete search history.

(56) References Cited

U.S. PATENT DOCUMENTS

| | | | | |
|---|---|---|---|---|
| 7,154,838 | B2 * | 12/2006 | Kamei et al. | 369/112.08 |
| 2004/0141452 | A1 * | 7/2004 | Ito | 369/120 |
| 2007/0053167 | A1 | 3/2007 | Ueda | |
| 2008/0237455 | A1 | 10/2008 | Ishida et al. | |
| 2010/0224767 | A1 * | 9/2010 | Kawano et al. | 250/216 |
| 2011/0019524 | A1 * | 1/2011 | Nakata et al. | 369/112.23 |
| 2011/0049557 | A1 * | 3/2011 | Meng | 257/99 |

FOREIGN PATENT DOCUMENTS

| | | |
|---|---|---|
| JP | 3-14723 | 2/1991 |
| JP | 4-114456 | 4/1992 |
| JP | 5-290404 | 11/1993 |
| JP | 2001-307371 | 11/2001 |
| JP | 2007-73849 | 3/2007 |
| JP | 2008-243869 | 10/2008 |

OTHER PUBLICATIONS

International Search Report issued Aug. 9, 2011 in International (PCT) Application No. PCT/JP2011/003404.

* cited by examiner

*Primary Examiner* — Thang Tran
(74) *Attorney, Agent, or Firm* — Wenderoth, Lind & Ponack, L.L.P.

(57) ABSTRACT

Provided are an optical head and an optical information device capable of inhibiting the temperature rise of a photodetector. An optical head (10) includes a semiconductor laser (101) which emits a luminous flux, an objective lens (105) which focuses the luminous flux emitted from the semiconductor laser (101) on the optical disk (21), and a photodetector (120) which detects the luminous flux reflected by the optical disk (21). The photodetector (120) includes a light receiving part (123) which receives the luminous flux reflected by the optical disk (21), a package (125) which covers the light receiving part (123), and a heat transfer adhesion layer (124) disposed between the package (125) and the light receiving part (123). The heat transfer adhesion layer (124) is formed in a region that is on the light receiving part (123) and includes a light path through which the luminous flux reflected by the optical disk (21) passes.

17 Claims, 30 Drawing Sheets

STRAY LIGHT FROM
OTHER LAYERS

OPTICAL HEAD AND OPTICAL INFORMATION DEVICE

TECHNICAL FIELD

The present invention relates to an optical head which records or reproduces information to or from an information recording medium such as an optical disk or an optical card, and to an optical information device provided with such an optical head.

BACKGROUND ART

A photodetector in a conventional optical head includes a light receiving part configured from a silicon semiconductor (multilayer silicon wafer), an operation circuit which converts the amount of luminous flux received by the light receiving part into voltage and performs a predetermined operation, and a signal output unit which outputs the voltage to become an output signal from the operation circuit. In addition, a circuit board and a pad part configured on the circuit board are connected via wire bonding. Moreover, the light receiving part, the operation circuit, the signal output unit and the circuit board are packaged and retained with a resin package.

Note that a terminal part that is electrically connected to the pad part is configured on the circuit board, and the terminal part is mounted on and fixed to a flexible printed circuit board (hereinafter also referred to as the "FPC board"). In addition, the photodetector is fixed to a holder, and the holder is bonded and fixed to an optical base (for example, refer to Patent Literature 1). Here, the resin package has a thermal resistance; that is, it has a low coefficient of thermal conductivity. Thus, regardless of whether the material of the holder is metal or resin, the amount of heat that transfers from the photodetector to the resin package is extremely small. Meanwhile, since the photodetector itself has a large volume and a large thermal capacity, the temperature rise of the photodetector caused by the amount of heat that is generated from the photodetector itself was approximately 10° C. or less.

FIG. 25 is a diagram showing the configuration the optical system of a conventional optical head 400. In FIG. 25, the optical head 400 comprises a semiconductor laser 401, a diffraction grating 402, a beam splitter 403, a collimator lens 404, an objective lens 405, an objective lens actuator 406, a cylindrical lens 408, a photodetector 409 and a holder 410.

The light beam emitted from the semiconductor laser 401 is separated into a plurality of different luminous fluxes by the diffraction grating 402. The luminous flux transmitted through the diffraction grating 402 is reflected by the beam splitter 403, and converted into a parallel luminous flux by the collimator lens 404. In addition, the luminous flux enters the objective lens 405 and becomes so-called 3-beam convergent light. This convergent light is irradiated to the recording layer of the optical disk 407. The luminous flux that has been reflected and diffracted by the recording layer of the optical disk 407 is once again transmitted through the objective lens 405 and is then transmitted through the beam splitter 403. The luminous flux transmitted through the beam splitter 403 passes through the cylindrical lens 408 and enters the photodetector 409.

Here, the photodetector 409 is fixed to the holder 410, and receives the luminous flux that passed through the holder 410. FIG. 26 is a diagram showing the arrangement of the light receiving parts on the light receiving surface of the photodetector of a conventional optical head. The luminous flux transmitted through the cylindrical lens 408 is received by the quartered light receiving part 420, and a so-called focus error signal is thereby generated.

FIG. 27 is a diagram showing the detection optical system of a conventional optical head, and FIG. 28 is a diagram showing the luminous flux that is formed at the quartered light receiving part of the photodetector of a conventional optical head. As shown in FIG. 27, the cylindrical lens 408 includes a cylindrical surface 408a on the exit face side of the luminous flux, and includes a concave lens surface 408b on the entry face side. The cylindrical lens 408 generates an astigmatic difference having a different focal point position at a 90-degree angle in the in-plane that is orthogonal to the optical axis. Moreover, the direction of the cylindrical surface 408a is disposed at an angle that is inclined substantially 45 degrees relative to the quartered light receiving part 420 of the photodetector 409.

The relative distance between the recording layer of the optical disk 407 and the objective lens 405 changes due to the face deflection of the optical disk 407 and other reasons. Consequently, as shown in FIG. 28, the luminous flux 422a at the focal point position becomes a circular shape, and the luminous flux 422b at the anterior focal line and the luminous flux 422c at the posterior focal line become a mutually orthogonal oval shape.

In FIG. 26, the focus error signal is detected by operating the difference of the sum signal of the diagonal light receiving region of the quartered light receiving part 420, and the RF signal is detected by operating the sum signal of all light receiving regions of the quartered light receiving part.

Moreover, the sub beam light receiving part 421 of the photodetector 409 is focused on the track of the recording layer of the optical disk 407, and receives the sub beam in the 3-beam method that has been reflected from the recording layer. In addition, the tracking error signal is generated by the so-called 3-beam method which uses the push-pull signal that has been operated based on the amount of received light of the main beam 422 of the quartered light receiving part 420, and the signal that has been operated based on the amount of received light of the sub beam 413 of the sub beam light receiving part 421, and tracking servo of causing the objective lens 405 to follow the track of the recording layer of the optical disk 407 is performed.

FIG. 29A to FIG. 29C are diagrams showing the configuration of the photodetector 409 of a conventional optical head.

FIG. 29A is a front view showing the configuration of the photodetector of a conventional optical head, FIG. 29B is a partial cross section of the photodetector shown in FIG. 29A, and FIG. 29C is a diagram viewing the photodetector shown in FIG. 29B from above.

As shown in FIG. 29A and FIG. 29B, the photodetector comprises a silicon semiconductor 431, a package 441, a circuit board 442 and an FPC board 445.

In FIG. 29A, the silicon semiconductor 431 includes a quartered light receiving part 420, a sub beam light receiving part 421, an operation circuit 432 and a signal output unit 433. The operation circuit 432 converts the amount of luminous flux received by the quartered light receiving part 420 and the sub beam light receiving part 421 into voltage and performs a predetermined operation. The signal output unit 433 is connected to the operation circuit 432, and outputs the voltage to become an output signal from the operation circuit 432.

As shown in FIG. 29B, a circuit board 442 is provided to the lower part of the silicon semiconductor 431. The signal output unit 433 and the pad part 443 provided to the circuit board 442 are connected via a wire bonding 446. The circuit board 442 is mounted on and fixed to the FPC board 445 by the terminal part 444 that is electrically connected to the pad part 443. Moreover, the package 441 covers the silicon semiconductor 431, the circuit board 442 and the wire bonding 446.

As shown in FIG. 29C, when considering the region of the wire bonding 446 and the formation strength of the resin package 441, the projection area of the photodetector 409 (that is, the projection area of the package 441) relative to the projection area of the silicon semiconductor 431 will increase. The size of the photodetector 409 using this kind of resin package 441 in the X direction, Y direction and Z direction will be, for example, roughly 7 mm, 5 mm and 3 mm, respectively.

FIG. 30 is a cross section showing the configuration of the peripheral portion of the photodetector 409 of a conventional optical head 400. In FIG. 30, the optical base 411 retains, for example, a semiconductor laser 401 (not shown), a diffraction grating 402 (not shown), a beam splitter 403, a collimator lens 404 and a cylindrical lens 408. Moreover, the photodetector 409 is fixed to the holder 410. In addition, the holder 410 is fixed to the optical base 411 upon positioning the photodetector 409 so that the luminous flux enters the substantial center of the quartered light receiving part 420 (not shown).

Currently, the development of a compact optical head capable of recording or reproducing information to or from a multilayer optical disk of a high recording density having two or more recording layers is anticipated. In order to realize a compact optical head capable of recording or reproducing information to or from a multilayer optical disk, it is necessary to increase a so-called lateral magnification of a detection optical system, which is the ratio of the focal point distance of the objective lens of the optical head and the focal point distance of the collimator lens. In other words, among a plurality of recording layers, it is necessary to adopt a configuration where stray light reflected off another recording layer that is different from the recording layer to which the laser beam is focused does not enter the sub beam light receiving part, and downsize the detection optical system of outward path.

An offset is generated in the tracking error signal when stray light reflected by another recording layer enters the sub beam light receiving part. Moreover, the DC level of the tracking error signal will change due to the interference of the reflected light from the recording layer on which the optical spot is being focused, and the reflected light from another recording layer, thereby considerably degrading the performance of the tracking servo, and deteriorating the recording performance and reproduction performance. In particular, since the amount of light of the sub beam is roughly 1/10 in comparison to the main beam, the tracking error signal will change considerably due to a slight change in the amount of light caused by the interference.

Thus, considered may be distancing the main beam and the sub beam. Nevertheless, by increasing the lateral magnification and distancing the main beam and the sub beam, the positions of the light receiving parts which respectively receive light will also become separated. Consequently, the area of the photodetector will increase, and it is no longer possible to simultaneously achieve the downsizing of the optical head and the improvement of the reproduction performance.

Thus, in order to simultaneously achieve the downsizing of the optical head and the improvement of the reproduction performance, considered may be increasing the so-called lateral magnification of the detection optical system, which is the ratio of the focal point position of the objective lens and the focal point distance of the collimator lens. According to this configuration, it is possible to adopt a configuration where the stray light reflected by another recording layer does not enter the sub beam light receiving part, downsize the detection optical system of return path of the optical head 400 and downsize the optical element and the photodetector, and thereby reduce the size of the optical head 400 in the height direction. Nevertheless, in order to downsize the detection optical system of return path, it is necessary to reduce the respective focal point distances of the objective lens, the collimator lens and the cylindrical lens, and downsize the respective components. Thus, it is necessary to downsize the photodetector and improve the radiation capability associated with the downsizing of the photodetector.

The power consumption of the photodetector during recording and during reproduction is, for example, approximately 0.15 W to 0.5 W. When the volume becomes approximately 1/10 due to the downsizing of the photodetector, if the power consumption is the same as before the downsizing, the temperature of the photodetector itself will increase, and far exceed the operational guaranteed temperature of the photodetector. In the case of a photodetector in a so-called slim size optical disk drive (optical information equipment), the size in the X direction is, for example, roughly 7 mm, the size in the Y direction is, for example, roughly 5 mm, and the size in the Z direction is, for example, roughly 3 mm. Note that the size of a photodetector in a slim size optical disk drive in the Y direction is desirably 4 mm or less.

When the capacity of the photodetector is caused to be 1/10 by increasing the magnification of the detection optical system of the photodetector in which the temperature rises approximately 10° C., the temperature of the photodetector will rise 20° C. to 30° C. or higher. When recording information on a multilayer optical disk requiring high recording power, and when recording information on a multilayer optical disk at a high speed, the temperature of the blue semiconductor laser as the light source will rise, and the temperature of the overall optical head will also increase. Thus, when the operating environment temperature becomes a high temperature, the temperature of the photodetector will increase even further.

FIG. 31 is a diagram explaining the temperature rise of the conventional photodetector 409. Let it be assumed that the guaranteed temperature of the photodetector is 100° C. If the peripheral temperature of the optical disk drive (optical information equipment) 450 is set to 60° C., during the high speed recording of the multilayer optical disk 407, the temperature of the photodetector 409 will reach approximately 90° C. due to the heat generation from the circuit board, the heat generation from the semiconductor laser 401, the heat generation from the objective lens actuator 406, the heat generation from the laser driver, and so on. In addition, due to the smaller thermal capacity caused by the downsizing of the photodetector 409 and aggravation of the radiation characteristics, when the temperature rises 20° C. to 30° C., the temperature of the photodetector 409 will become 110° C. to 120° C., and will considerably exceed the performance guaranteed temperature of the photodetector 409. In order to inhibit the temperature rise of the photodetector 409 to 10° C. or less, it is necessary to adopt a configuration where the heat generation from the photodetector 409 itself is efficiently radiated into the air.

FIG. 32 is a diagram explaining the relation between the magnification of the detection optical system of a conventional optical head and the pitch of the main beam and the sub beam on the photodetector, and the relation between the magnification of the detection optical system and the pitch of two sub beams on the photodetector. Table 1 is a table showing the relation of the magnification of the detection optical system and the pitch of the main beam and the sub beam on the photodetector, and the relation of the magnification of the detection optical system and the pitch of the two sub beams on the photodetector.

TABLE 1

|  | Magnification of Detection Optical System (Lateral Magnification β) | | |
|---|---|---|---|
|  | 6 | 14 | 16 |
| Spacing X (μm) of Main Beam and Sub Beam | 120 | 280 | 320 |
| Spacing Y (μm) of Sub Beams | 240 | 560 | 640 |

Note that the focus error signal is calculated based on following Formula (1), and the tracking error signal is calculated based on following Formula (2).

$$\text{Focus error signal} = (A2+A4)-(A1+A3) \quad (1)$$

$$\text{Tracking error signal} = (A3+A4)-(A1+A2) = k(B2-B1) \quad (2)$$

Note that, in foregoing Formula (1) and Formula (2), A1 to A4 represent the output of the respective light receiving regions of the quartered light receiving part 420, B1 and B2 represent the output of the respective light receiving regions of the sub beam light receiving part 421 that has been divided into two parts, and k represents the gain. The gain k is usually set to a value of roughly 1 to 5.

The lateral magnification of the detection optical system that is generally used in a conventional optical head is substantially 6 times, and, on the assumption that the pitch of the main beam and the sub beam on the optical disk is 20 μm, the pitch P of the main beam 422 and the sub beam 423 on the photodetector 409 will be 120 μm. Meanwhile, if the magnification of the detection optical system is set between 14 times and 16 times in order to reproduce a multilayer optical disk, the pitch P of the main beam 422 and the sub beam 423 on the photodetector 409 will increase to 280 μm to 320 μm, and, similarly, the pitch Q of the two sub beams 423 will increase to nearly triple. Thus, the size R of the silicon semiconductor 431 including the quartered light receiving part 420, the sub beam light receiving part 421 and the operation circuit (not shown) in the Y direction will increase. Since the size R of the silicon semiconductor 431 in the Y direction will increase, it is necessary to reduce the size of the photodetector 409 in the Y direction to be as small as possible, and simultaneously inhibit the temperature rise of the photodetector 409 itself efficiently.

CITATION LIST

Patent Literature

Patent Literature 1: Japanese Patent Application Publication No. H05-290404

SUMMARY OF INVENTION

The present invention was devised in order to resolve the foregoing problems. Thus, an object of this invention is to provide an optical head and an optical information device capable of inhibiting the temperature rise of a photodetector.

The optical head according to one aspect of the present invention is an optical head which records or reproduces information to or from an information recording medium having a recording layer, comprising a light source which emits a luminous flux, an objective lens which focuses the luminous flux emitted from the light source on the information recording medium, and a photodetector which detects the luminous flux reflected by the information recording medium, wherein the photodetector includes a light receiving part which receives the luminous flux reflected by the information recording medium, a package member which covers the light receiving part, and an adhesion layer which bonds the package member and the light receiving part, and wherein the adhesion layer is formed in a region that is on the light receiving part and includes a light path through which the luminous flux reflected by the information recording medium passes.

According to the foregoing configuration, the light source emits a luminous flux. The objective lens focuses the luminous flux emitted from the light source on the information recording medium. The photodetector detects the luminous flux reflected by the information recording medium. The light receiving part receives the luminous flux reflected by the information recording medium. The package member covers the light receiving part. The adhesion layer bonds the package member and the light receiving part. The adhesion layer is formed in a region that is on the light receiving part and includes a light path through which the luminous flux reflected by the information recording medium passes.

According to the present invention, since the heat generated from the photodetector is transferred to the adhesion layer, it is possible to inhibit the temperature rise of the photodetector and realize the downsizing of the optical head and the stabilization of the detection signal.

The object, features and advantages of the present invention will become more apparent based on the ensuing detailed explanation and appended drawings.

DESCRIPTION OF EMBODIMENTS

Embodiments of the present invention are now explained with reference to the drawings. Note that the following embodiments are merely examples that exemplify the present invention, and are not intended to limit the technical scope of the present invention.

Embodiment 1

Figure 1:
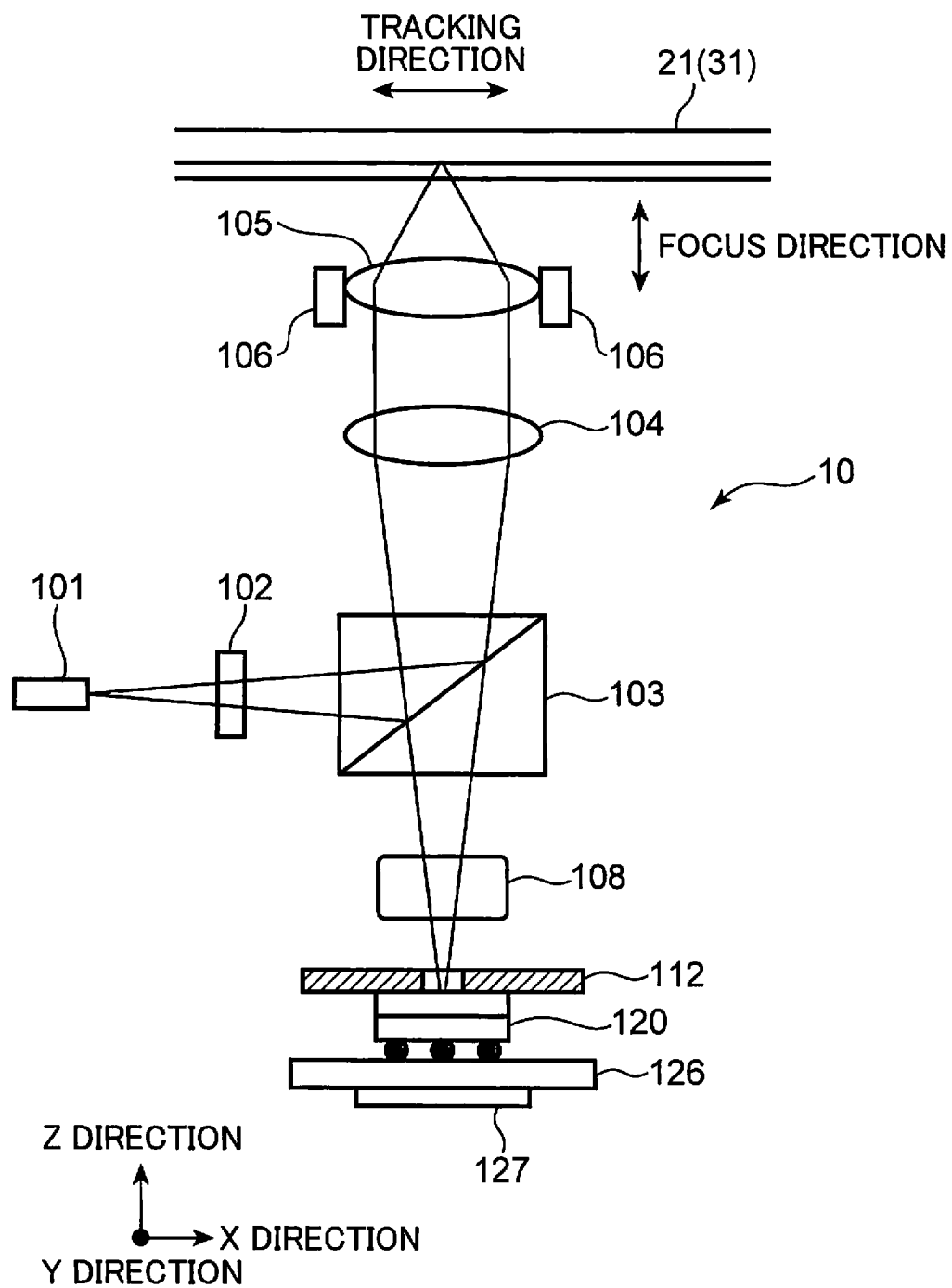
FIG. 1 is a diagram showing the configuration of the optical system of the optical head in Embodiment 1 of the present invention.

FIG. 1 is a diagram showing the configuration of the optical system of the optical head in Embodiment 1 of the present invention.

In FIG. 1, the optical head 10 comprises a semiconductor laser 101, a diffraction grating 102, a beam splitter 103, a collimator lens 104, an objective lens 105, an objective lens actuator 106, a cylindrical lens 108, a metal holder 112, a photodetector 120, an FPC board (flexible printed circuit board) 126 and a metal radiator plate 127.

The semiconductor laser 101 emits a luminous flux. The luminous flux that is emitted from the semiconductor laser 101 as the light source is separated into a plurality of different luminous fluxes by the diffraction grating 102. The diffraction grating 102 divides the luminous flux emitted from the semiconductor laser 101. The diffraction grating 102 divides the incident luminous flux into a main beam, and first and second sub beams.

The luminous flux transmitted through the diffraction grating 102 is reflected by the beam splitter 103, thereafter converted into a parallel luminous flux by the collimator lens 104, and then enters the objective lens 105. The objective lens 105 focuses the luminous flux emitted from the semiconductor laser 101 on the optical disk 21. The luminous flux that entered the objective lens 105 becomes so-called 3-beam convergent light, and is irradiated on the optical disk 21. The objective lens 105 is driven by the objective lens actuator 106 (details not shown) in the optical axis direction (focus direction) and the tracking direction (radial direction) of the optical disk 21.

The luminous flux that has been reflected and diffracted by the recording layer of the optical disk 21 is once again transmitted through the objective lens 105 and the collimator lens 104, and then enters the beam splitter 103. The luminous flux transmitted through the beam splitter 103 enters the cylindrical lens 108. The cylindrical lens 108 generates astigmatism in the reflected luminous flux reflected by the optical disk 21. The luminous flux transmitted through the cylindrical lens 108 enters the photodetector 120. The photodetector 120 detects the reflected luminous flux in which the astigmatism was generated by the cylindrical lens 108.

Figure 2A:
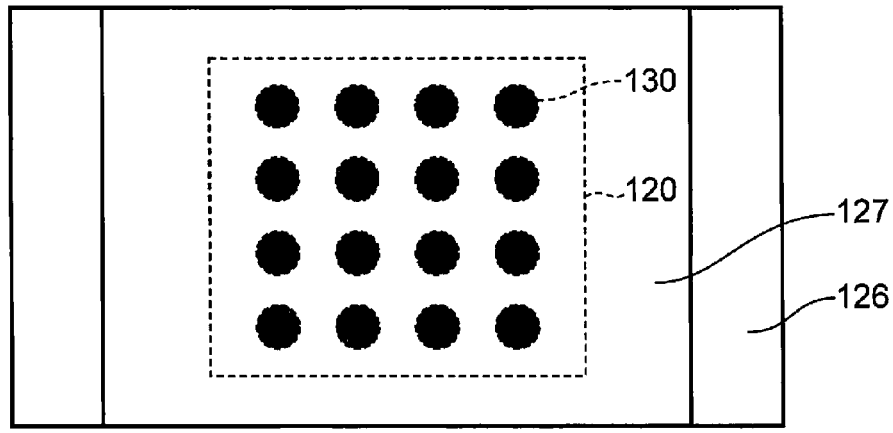
FIG. 2A is a diagram showing the bottom face of the photodetector in Embodiment 1 of the present invention.
Figure 2B:
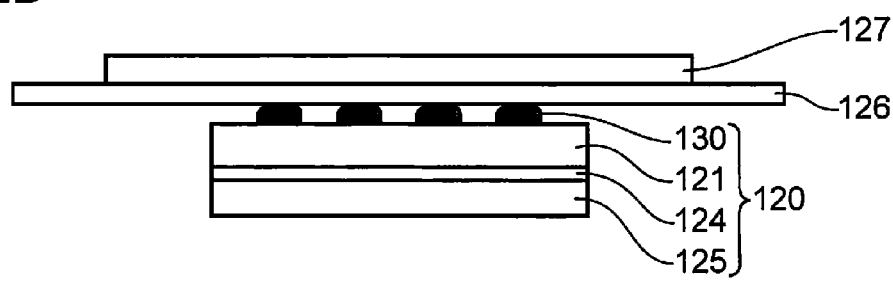
FIG. 2B is a diagram showing the side face of the photodetector in Embodiment 1 of the present invention.
Figure 2C:
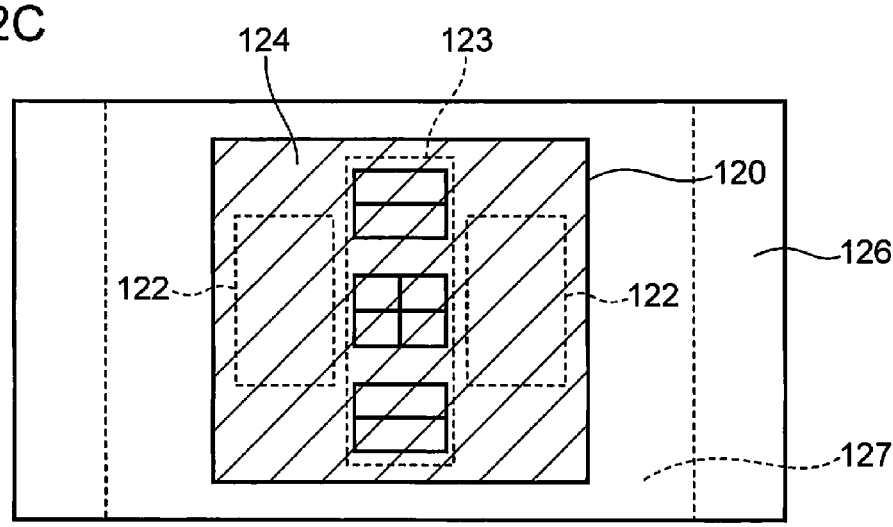
FIG. 2C is a diagram showing the front face of the photodetector in Embodiment 1 of the present invention.

FIGS. 2A to 2C are diagrams showing the configuration of the photodetector 120 and the FPC board 126. FIG. 2A is a diagram showing the bottom face of the photodetector in Embodiment 1 of the present invention, FIG. 2B is a diagram showing the side face of the photodetector in Embodiment 1 of the present invention, and FIG. 2C is a diagram showing the front face of the photodetector in Embodiment 1 of the present invention.

In FIGS. 2A to 2C, the photodetector 120 includes a silicon semiconductor 121, a heat transfer adhesion layer 124, a package 125 and a signal output unit 130. Formed on the silicon semiconductor 121 are a light receiving part 123, an operation circuit 122 and a signal output unit 130. The light receiving part 123 receives the reflected luminous flux reflected by the optical disk 21. The operation circuit 122 performs a predetermined operation on an electrical signal obtained by subjecting the luminous flux received by the light receiving part 123 to photoelectric conversion. The signal output unit 130 is connected to the operation circuit 122, and outputs the voltage to become an output signal from the operation circuit 122. The light receiving part 123 and the operation circuit 122 are formed on the face on the light entry side of the silicon semiconductor 121, and the signal output unit 130 is formed on a face that is opposite to the face on the light entry side. The package 125 covers the light receiving part 123 and the operation circuit 122. The heat transfer adhesion layer 124 bonds the silicon semiconductor 121 and the package 125.

In other words, the photodetector 120 comprises a light receiving part 123, a package 125 and a heat transfer adhesion layer 124. The heat transfer adhesion layer 124 is disposed between the package 125 and the light receiving part 123, and bonds the package 125 and the light receiving part 123. The heat transfer adhesion layer 124 is formed in a region that is on the light receiving part 123 and includes a light path through which the luminous flux reflected by the optical disk 21 passes. Moreover, the package 125 is formed in a region that includes a light path through which the luminous flux reflected by the optical disk 21 passes.

Here, the package 125 is made of a transparent material. In the ensuing explanation, an example using glass as the package 125 is shown. Here, the thickness of the silicon semiconductor 121 is approximately 0.3 mm, the thickness of the glass package 125 is approximately 0.7 mm, the thickness of the photodetector 120 is approximately 1 mm even upon considering the thickness of the heat transfer adhesion layer 124, and considerable thinning is realized.

Moreover, the length of the photodetector 120 in the X direction and Y direction is approximately 2.5 mm, respectively, and considerable downsizing is also realized in the projection area of the photodetector 120. The considerable downsizing of the thickness and projection area is realized as a result of the configuration where the photodetector 120 does not use a resin package, and the volume is ¹/₁₀ or less in comparison to conventional technology.

This glass package 125 is bonded and fixed to the metal holder 112 shown in FIG. 1. Consequently, the heat generated in the silicon semiconductor 121 of the photodetector 120 is transferred to the metal holder 112 via the heat transfer adhesion layer 124 and the glass package 125, and radiated. The coefficient of thermal conductivity of glass is 5 times to 10 times higher in comparison to resin (approximately 1 W/m·K). Thus, the glass package 125 is capable of considerably improving the heat transfer characteristics (thermal resistance) in comparison to a resin package.

With a conventional photodetector, a configuration where air space exists on the light path to which light enters the photodetector is normally adopted. In other words, with a conventional photodetector, an adhesive is not applied on the light receiving surface of the light receiving part, and an adhesive is applied to the peripheral part on the light receiving surface of the light receiving part, and a gap is provided between the light receiving surface of the light receiving part and the package 125. Meanwhile, in Embodiment 1, the heat transfer adhesion layer 124 is filled on the light receiving part. According to this configuration, in addition to being able to increase the adhesive strength between the glass package 125 and the silicon semiconductor 121, since no air space exists between the light receiving part 123 and the glass package 125, the adsorption of impurities (so-called optical tweezers) caused by the blue light having a wavelength of 405 nm will not occur. Thus, reliability can be ensured. In addition, the amount of heat generated by the light receiving part 123 can be effectively radiated to the metal holder 112 via the heat transfer adhesion layer 124. Here, since the adhesion layer can transfer heat, it is referred to as the heat transfer adhesion layer.

Here, the heat transfer adhesion layer 124 is desirably configured, for example, from silicon resin, and the coefficient of thermal conductivity of the heat transfer adhesion layer 124 is desirably 0.5 W/m·K or more. Moreover, the coefficient of thermal conductivity of the heat transfer adhesion layer 124 is desirably 1 W/m·K or more.

Note that, since the heat transfer adhesion layer 124 exists on the light path, there is an additional problem in that the material used for the heat transfer adhesion layer 124 becomes degraded due to high power light such as blue light, and noise is generated in the light reception signal. Thus, if the heat transfer adhesion layer 124 is made, for example, from silicon resin, the heat transfer adhesion layer 124 is made from a composition that does not contain an epoxy-based compound. As a result of studies conducted by the present inventors and others, degradation of the heat transfer adhesion layer 124 caused by the blue light was observed in cases where an epoxy-based compound is contained upon forming the silicon resin. Thus, as a result of configuring the heat transfer adhesion layer 124 from a composition that does not contain an epoxy-based compound and impurities, it is possible to reduce the degradation, so-called blue light degradation, of resin caused by blue light having a wavelength of 405 nm.

In addition, the refractive index of the heat transfer adhesion layer 124 and the glass package 125 is both preferably within the range of 1.5 to 1.6. Moreover, while the glass package 125 includes an antireflection film (AR coating) on the entry luminous flux face, preferably the configuration does not include an AR coating on the boundary surface of the glass package 125 and the heat transfer adhesion layer 124. In other words, an antireflection film is formed on a face of the package 125 where the luminous flux reflected by the optical disk 21 enters, and an antireflection film is not formed on a boundary surface of the package 125 and the heat transfer adhesion layer 124.

According to the foregoing configuration, it is possible to maintain the adhesive strength of the heat transfer adhesion layer 124 and the glass package 125 while maintaining the transmittance. Here, the film specification of the AR coating is desirably set to achieve maximum transmittance relative to light having a wavelength of 405 nm. According to the foregoing configuration, it is possible to obtain a reproduction signal with a favorable S/N even in cases of reproducing information from the multilayer optical disk 31 having low reflectance relative to light having a wavelength of 405 nm.

Moreover, simultaneously with radiating the photodetector 120 with the foregoing metal holder 112, it is also possible to perform the radiation with the metal radiator plate 127 disposed on the rear face of the photodetector 120. The optical head 10 additionally comprises an FPC board 126 and a metal radiator plate 127. The FPC board 126 is disposed on a side that is far from the objective lens of the photodetector 120 and connected to the signal output unit 130. Note that the FPC board 126 is an example of the printed circuit board. The metal radiator plate 127 is disposed to come in contact with a face that is opposite to the face, of the FPC board 126, to which the signal output unit 130 is connected.

As a result of the signal output unit 130 being mounted on the FPC board 126 via soldering, the signal detected by the light receiving part 123 is transmitted to the main board of the body of the information recording device from the optical head 10. The glass package 125 is disposed on the entry luminous flux side. The portion shown with the diagonal lines of FIG. 2C shows the region of the heat transfer adhesion layer 124. The material configuring the heat transfer adhesion layer 124 is selected based on the balance of the transmittance resulting from the combination of the glass package 125 and the heat transfer adhesion layer 124, and the quality degradation of the heat transfer adhesion layer 124 caused by light having a wavelength of 405 nm. In Embodiment 1, as the material of the heat transfer adhesion layer 124, used is transparent silicon resin that is stable against light having a wavelength of 405 nm and in which the transmittance of light having a wavelength of 400 nm to 800 nm exceeds 90%. Note that the transmittance of the heat transfer adhesion layer 124 is desirably 99% or higher relative to light having a wavelength of 405 nm.

Moreover, the connection of the signal output unit 130 and the operation circuit 122 is configured to be connected via wiring from the side face of the photodetector 120, or connected with the signal output unit 130 of the bottom face by providing via holes or the like to the operation circuit 122 configured from a laminated circuit. The heat transfer adhesion layer 124 is at least formed on the light receiving surface of the light receiving part 123, can also be formed on the operation circuit 122 and the light receiving surface of the light receiving part 123, and can also be formed on the entire surface of the silicon semiconductor 121. The metal radiator plate 127 is mounted on the FPC board 126 via an adhesive or the like.

Figure 3A:
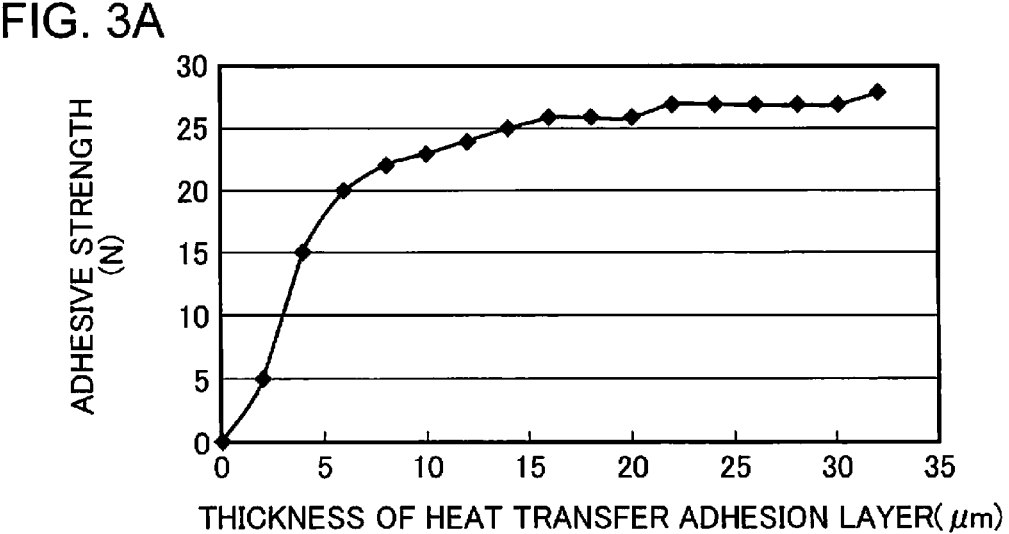
FIG. 3A is a diagram showing the relation between the thickness and adhesive strength of the heat transfer adhesion layer.
Figure 3B:
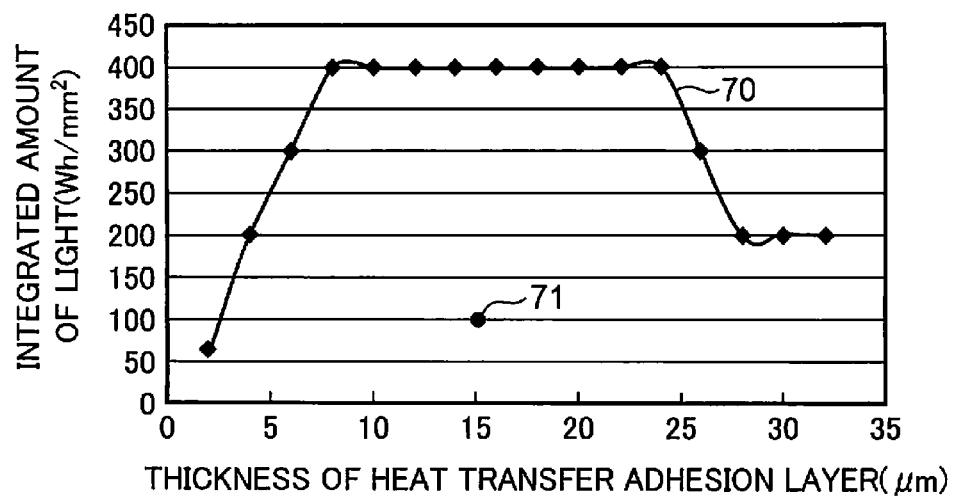
FIG. 3B is a diagram showing the relation between the thickness and integrated amount of light of the heat transfer adhesion layer.
Figure 3C:
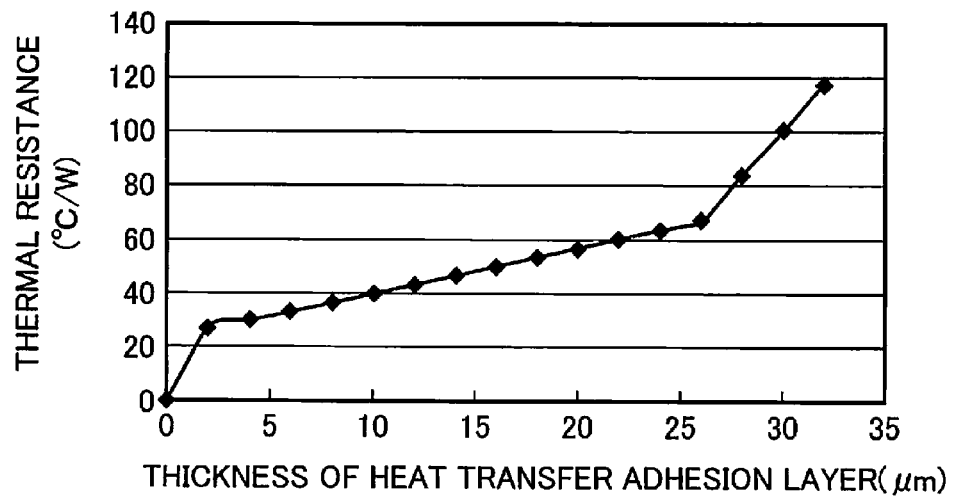
FIG. 3C is a diagram showing the relation between the thickness and thermal resistance of the heat transfer adhesion layer.

FIG. 3A is a diagram showing the relation between the thickness and adhesive strength of the heat transfer adhesion layer 124, FIG. 3B is a diagram showing the relation between the thickness and integrated amount of light of the heat transfer adhesion layer 124, and FIG. 3C is a diagram showing the relation between the thickness and thermal resistance of the heat transfer adhesion layer 124. From the perspective of adhesive strength, blue light degradation and coefficient of thermal conductivity (thermal resistance), the thickness of the heat transfer adhesion layer 124 is desirably within the range of 5 μm to 25 μm.

FIG. 3A is a graph showing an example of the results of measuring the relation between the thickness and adhesive strength of the heat transfer adhesion layer 124. The horizontal axis shows the thickness of the heat transfer adhesion layer 124 and the vertical axis shows the adhesive strength (N). When the thickness of the heat transfer adhesion layer 124 is 5 μm or more, it is possible to satisfy the required adhesive strength of 15(N) or more.

FIG. 3B is a graph showing an example of the results upon measuring the relation of the thickness of the heat transfer adhesion layer 124 and the blue light degradation. The horizontal axis shows the thickness of the heat transfer adhesion layer 124, and the vertical axis shows the integrated amount of light (Wh/mm$^2$). Moreover, the graph 70 in FIG. 3B shows the relation of the thickness of the heat transfer adhesion layer of a composition that does not contain an epoxy-based compound, and the blue light degradation, and point 71 shows the relation of the thickness of the heat transfer adhesion layer of a composition that contains an epoxy-based compound, and the blue light degradation.

If the thickness of the heat transfer adhesion layer 124 is less than 6 μm, the heat transfer adhesion layer 124 will crack due to the expansion and contraction thereof since the thickness of the layer is thin. Meanwhile, if the thickness of the heat transfer adhesion layer 124 exceeds 25 μm, air bubbles tend to be generated in the heat transfer adhesion layer 124. Thus, if the thickness of the heat transfer adhesion layer 124 is within the range of 5 μm to 25 μm, it is possible to satisfy 250 Wh/mm$^2$ as the integrated amount of light which is required for detection.

Moreover, when the heat transfer adhesion layer 124 is configured from a composition that does not contain an epoxy-based compound, the integrated amount of light becomes 100 Wh/mm$^2$ if the thickness of the heat transfer adhesion layer 124 is 15 μm, and it is not possible to satisfy 250 Wh/mm$^2$ as the integrated amount of light which is required for detection. Thus, the heat transfer adhesion layer 124 is configured from a composition that does not contain an epoxy-based compound.

FIG. 3C is a graph showing an example of the results of measuring the relation between the thickness and thermal resistance of the heat transfer adhesion layer 124. The horizontal axis shows the thickness of the heat transfer adhesion layer 124, and the vertical axis shows the thermal resistance (° C./W). Note that thermal resistance is the ease of heat transfer, and smaller the value, the easier the heat transfer. The thermal resistance can also be reduced by increasing the coefficient of thermal conductivity of the heat transfer adhesion layer 124, and can be considerably reduced by thinning the thickness of the heat transfer adhesion layer 124. The coefficient of thermal conductivity will decrease as the heat transfer adhesion layer 124 becomes thinner, but will drastically increase when the thickness of the heat transfer adhesion layer 124 exceeds 25 μm. Accordingly, from the perspective of adhesive strength, reliability in relation to the integrated amount of light and radiation characteristics, it is essential that the thickness of the heat transfer adhesion layer 124 be 5 μm or more and 25 μm or less, and is desirably 10 μm or more and 20 μm or less.

In addition, the performance guaranteed temperature of the silicon resin is approximately 100° C. Thus, radiation of the photodetector 120 is also essential from the perspective of the performance guaranteed temperature of the silicon resin.

Figure 4A:
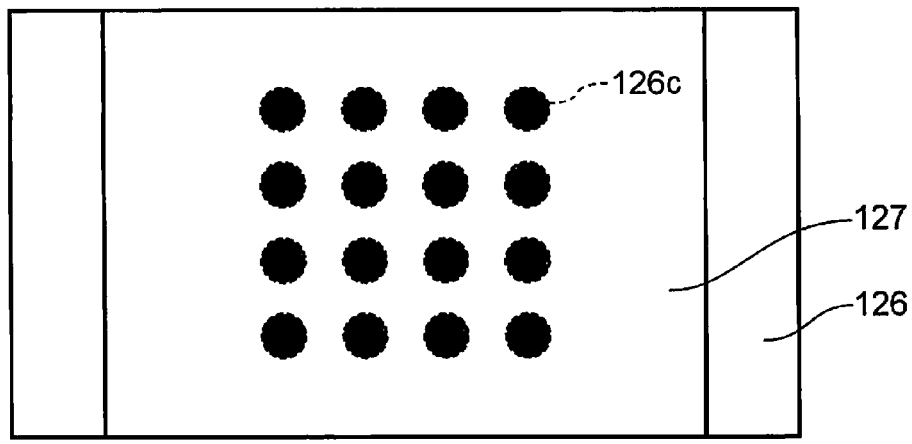
FIG. 4A is a diagram showing the bottom face of the FPC board and the metal radiator plate in Embodiment 1 of the present invention.
Figure 4B:
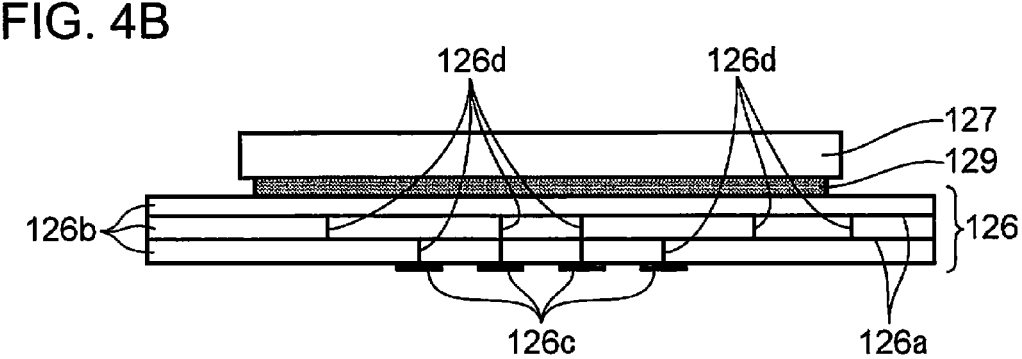
FIG. 4B is a diagram showing the cross section of the FPC board and the metal radiator plate in Embodiment 1 of the present invention.
Figure 4C:
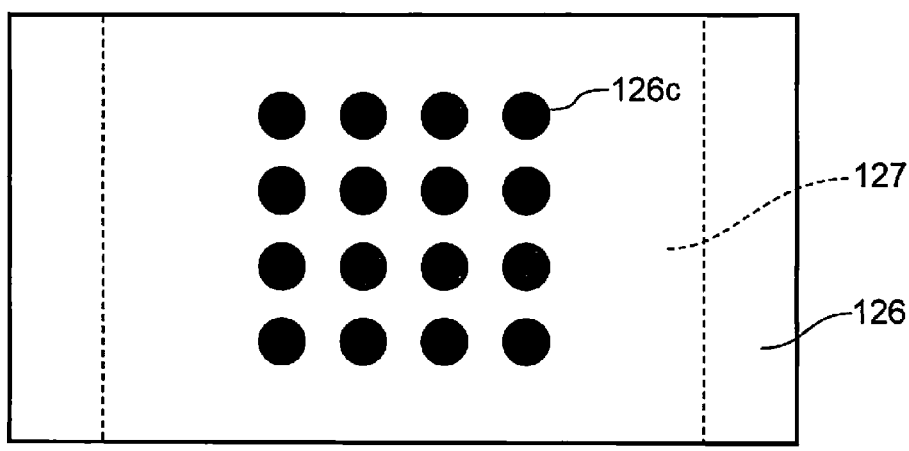
FIG. 4C is a diagram showing the front face of the FPC board and the metal radiator plate in Embodiment 1 of the present invention.

FIGS. 4A to 4C are diagrams showing the configuration of the FPC board 126 of the optical head and the metal radiator plate 127 in Embodiment 1 of the present invention. FIG. 4A is a diagram showing the bottom face of the FPC board and the metal radiator plate in Embodiment 1 of the present invention, FIG. 4B is a diagram showing the cross section of the FPC board and the metal radiator plate in Embodiment 1 of the present invention, and FIG. 4C is a diagram showing the front face of the FPC board and the metal radiator plate in Embodiment 1 of the present invention.

The FPC board 126 includes a plurality of wiring layers 126a configured from a copper foil, and a plurality of resin layers (covers) 126b made of polyimide or the like having superior thermal resistance. A preliminarily soldered land part 126c is formed on the face of the FPC board 126 to which the photodetector 120 is mounted. The land part 126c is disposed by being positioned with the signal output unit 130, and the signal output unit 130 is mounted on the land part 126c. The respective wiring layers 126a and the land parts 126c are wired with via holes 126d or the like. Moreover, the resin layer 126b and the wiring layer 126a are firmly bonded via adhesion, thermocompression bonding or the like.

The FPC board 126 is configured from a wiring layer 126a made from a copper foil, a resin layer 126b made from resin such as polyimide, and an adhesion layer (not shown) for bonding both the wiring layer 126a and the resin layer 126b. Note that the FPC board 126 includes a single layer structure FPC board having only one wiring layer, and a multilayer structure FPC board having two or more wiring layers. In this embodiment, the FPC board 126 is configured from two wiring layers 126a.

In addition, the metal radiator plate 127 is firmly fixed to a face that is opposite to the face on which the land part 126c of the FPC board 126 is formed via an adhesion layer 129 having a thickness of roughly 0.1 mm. Meanwhile, the thickness of the FPC board 126 is approximately 0.3 mm upon having two wiring layers.

The metal radiator plate 127 is made of metal such as aluminum, zinc, copper or SPCC (Steel Plate Cold Commercial). The thickness of the metal radiator plate 127 is, for example, 0.1 mm to 1 mm.

In a state where the photoconductor 120 is mounted on the FPC board 126, the heat generated in the photodetector 120 is transferred from the signal output unit 130 of the photodetector 120 to the metal radiator plate 127 via the land part 126c, the resin layer 126b, the via hole 126d (wiring), the wiring layer 126a and the adhesion layer 129. The thickness of the FPC board 126 is approximately 0.3 mm upon including two wiring layers. The power consumption of the photodetector 120 is approximately 0.25 W, and the size of the photodetector 120 in the X direction, Y direction and Z direction is approximately 2.5 mm, 2.5 mm and 1 mm, respectively, due to the downsizing. Accordingly, with the photodetector 120 in this embodiment, since the capacity is downsized to 1/10 or less in comparison to a conventional photodetector, it is necessary to adopt a configuration capable of efficiently transferring the heat generation caused by the power consumption of the photodetector 120 itself to the metal radiator plate 127.

Figure 5:
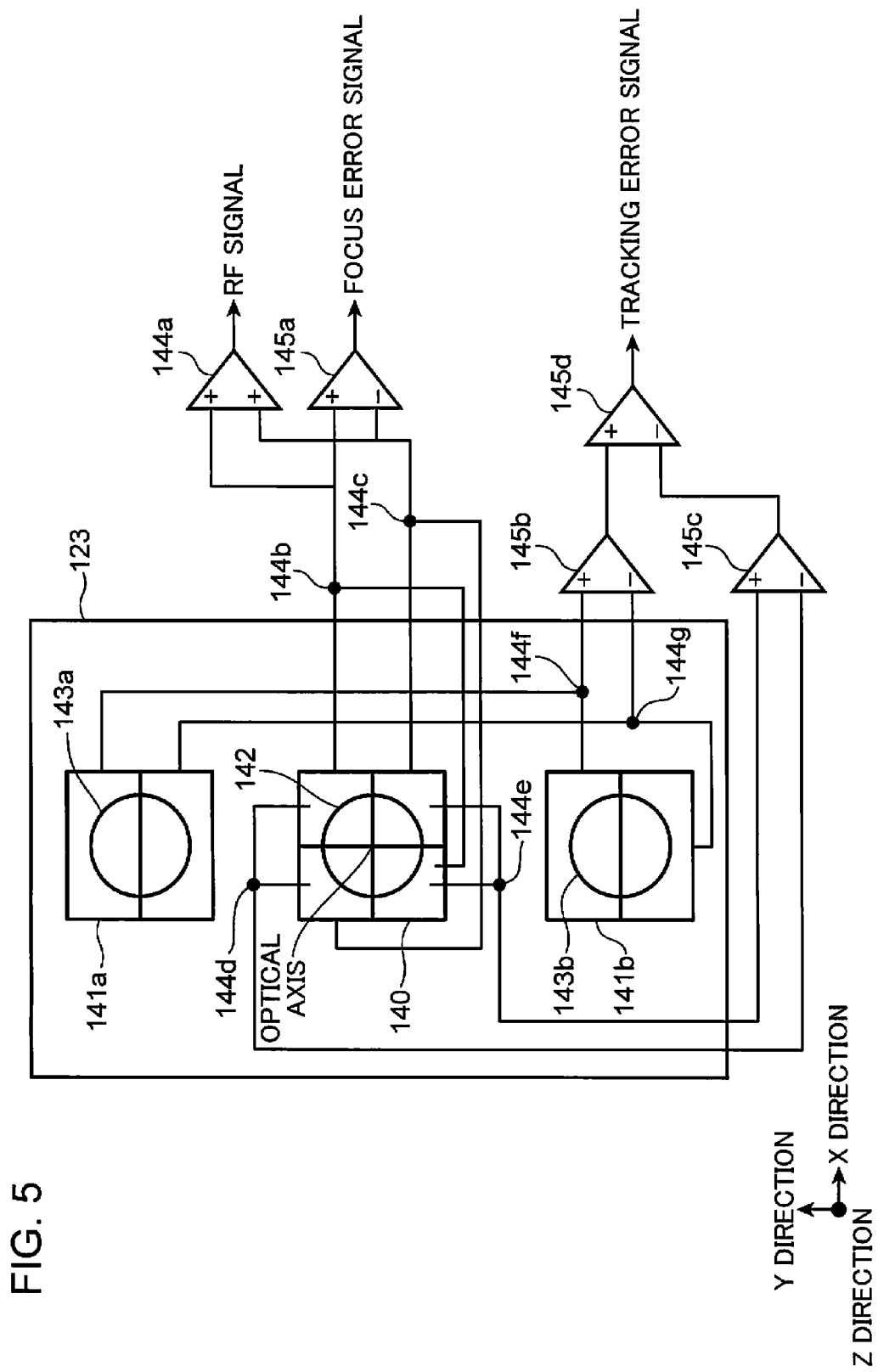
FIG. 5 is a diagram showing the configuration of the light receiving part of the photodetector and the configuration of the operation circuit in Embodiment 1 of the present invention.

FIG. 5 is a diagram showing the configuration of the light receiving part 123 of the photodetector 120 and the configuration of the operation circuit 122 in Embodiment 1 of the present invention. The light receiving part 123 includes a quartered light receiving region 140, a first sub beam light receiving region 141a and a second sub beam light receiving region 141b. The operation circuit 122 includes first to seventh summing amplifiers 144a to 144g and first to fourth differential amplifiers 145a to 145d.

The quartered light receiving region 140 receives the main beam 142 among the luminous fluxes that were transmitted through the cylindrical lens 108. The so-called focus error signal is generated by the first differential amplifier 145a operating the differential of the diagonal sum signal of the quartered light receiving region 140, and the RF signal is generated by the first summing amplifier 144a operating the sum of all signals of the quartered light receiving region 140.

In other words, the second summing amplifier 144b and the third summing amplifier 144c respectively add the signals that are output from the regions that are positioned at the opposing corners of the quartered light receiving region 140. The first differential amplifier 145a calculates the difference between the sum signal that is output from the second summing amplifier 144b and the sum signal that is output from the third summing amplifier 144c. Moreover, the first summing amplifier 144a adds the sum signal that is output from the second summing amplifier 144b and the sum signal that is output from the third summing amplifier 144c.

Meanwhile, the first sub beam light receiving region 141a and the second sub beam light receiving region 141b of the photodetector 120 receive the first sub beam 143a and the second sub beam 143b in the so-called 3-beam method which were focused on and reflected by the track of the recording layer of the optical disk 21. Among the luminous fluxes that were transmitted through the cylindrical lens 108, the first sub beam 143a and the second sub beam 143b are received by the first sub beam light receiving region 141a and the first sub beam light receiving region 141b. The first sub beam light receiving region 141a and the second sub beam light receiving region 141b are respectively divided into two regions along the Y direction (direction that is perpendicular to the tracking direction).

The push-pull signal operated based on the main beam 142 received by the quartered light receiving region 140 and the signal corresponding to the amount of light received by the first sub beam light receiving region 141a and the second sub beam light receiving region 141b are operated by the sixth and seventh summing amplifiers 144f, 144g and the second to fourth differential amplifiers 145b to 145d. Consequently, the tracking error signal in the 3-beam method; that is, the so-called DPP (differential push-pull) method is generated, and tracking servo of causing the objective lens 105 to follow the track of the recording layer of the optical disk 21 is performed.

In other words, the fourth summing amplifier 144d and the fifth summing amplifier 144e respectively add signals that were output from regions that are adjacent to the quartered light receiving region 140 in the X direction (tracking direction). The third differential amplifier 145c calculates the difference between the sum signal that is output from the fourth summing amplifier 144d and the sum signal that is output from the fifth summing amplifier 144e. Moreover, the sixth summing amplifier 144f adds the signal that is output from the upper region of the first sub beam light receiving region 141a and the signal that is output from the upper region of the second sub beam light receiving region 141b. The seventh summing amplifier 144g adds the signal that is output from the lower region of the first sub beam light receiving region 141a and the signal that is output from the lower region of the second sub beam light receiving region 141b. The second differential amplifier 145b calculates the difference between the sum signal that is output from the sixth summing amplifier 144f and the sum signal that is output from the seventh summing amplifier 144g. In addition, the fourth differential amplifier 145d calculates the difference between the difference signal that is output from the second differential amplifier 145b and the difference signal that is output from the third differential amplifier 145c.

Note that, in this embodiment, the semiconductor laser 101 corresponds to an example of the light source, the objective lens 105 corresponds to an example of the objective lens, the photodetector 120 corresponds to an example of the photodetector, the light receiving part 123 corresponds to an example of the light receiving part, the heat transfer adhesion layer 124 corresponds to an example of the adhesion layer, the package 125 corresponds to an example of the package member, the operation circuit 122 corresponds to an example of the operation part, the signal output unit 130 corresponds to an example of the signal output unit, the FPC board 126 corresponds to an example of the printed circuit board, the metal radiator plate 127 corresponds to an example of the radiator plate, the optical base 111 corresponds to an example of the optical base, and the metal holder 112 corresponds to an example of the holder.

Figure 6:
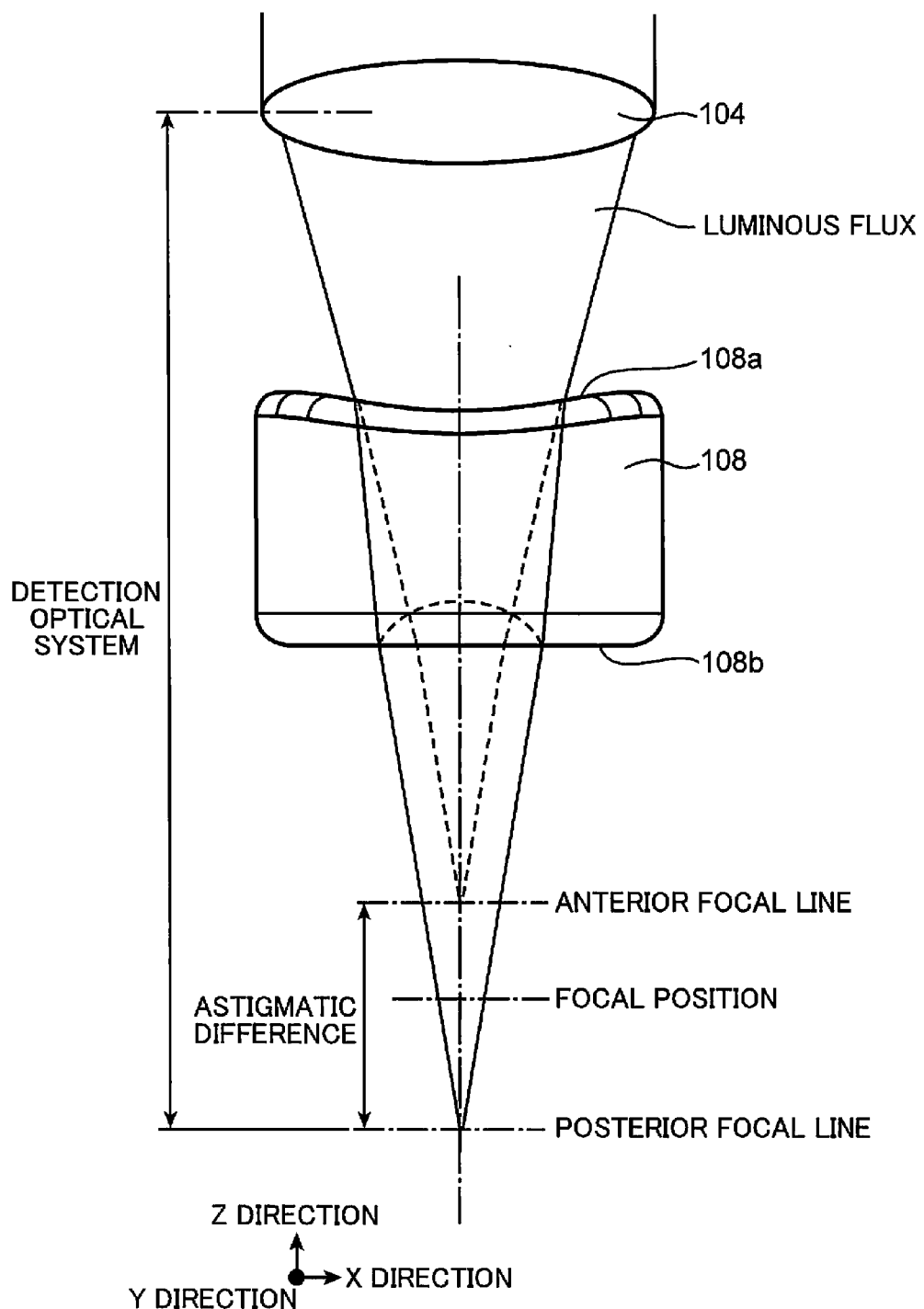
FIG. 6 is a diagram showing the configuration of the detection optical system including the cylindrical lens in Embodiment 1 of the present invention.

FIG. 6 is a diagram showing the configuration of the detection optical system including the cylindrical lens in Embodiment 1 of the present invention. As shown in FIG. 6, the cylindrical lens 108 includes a cylindrical surface 108a of a cylindrical shape on the entry face side of the luminous flux, and includes a concave lens surface 108b with lens power on the exit face side. The cylindrical surface 108a generates an astigmatic difference having a different focal point position at a 90-degree angle in the in-plane that is orthogonal to the optical axis. Moreover, the direction of the cylindrical surface 108a is disposed at an angle that is inclined substantially 45 degrees relative to the quartered light receiving region 140 of the photodetector 120.

Figure 7:
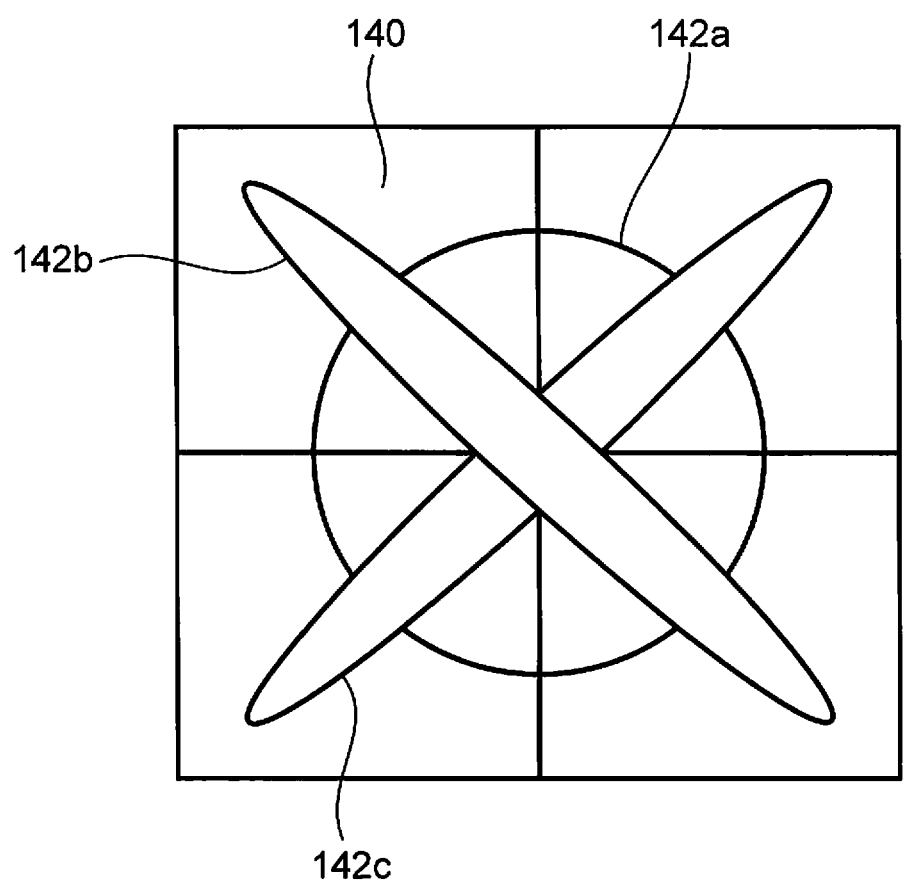
FIG. 7 is a diagram showing the shape of the main beam on the quartered light receiving region at the anterior focal line, the posterior focal line and the focal point position.

FIG. 7 is a diagram showing the shape of the main beam on the quartered light receiving region 140 at the anterior focal line, the posterior focal line and the focal point position. The main beam 142a at the focal point position becomes a circular shape, and the main beam 142b at the anterior focal line and the main beam 142c at the posterior focal line become a mutually orthogonal oval shape.

A luminous flux as shown in FIG. 7 is formed at the anterior focal line and the posterior focal line as a result of the relative distance between the recording layer of the optical disk 21 and the objective lens 105 changing due to the face deflection of the optical disk 21 or other reasons. The light receiving part 123 is thereby disposed at the focal point position of FIG. 6. The lateral magnification ($\beta$) of the detection optical system is decided based on the focal point distance of the objective lens 105, the focal point distance of the collimator lens 104, and the optical power of the concave lens surface 108b of the cylindrical lens 108.

Figure 8:
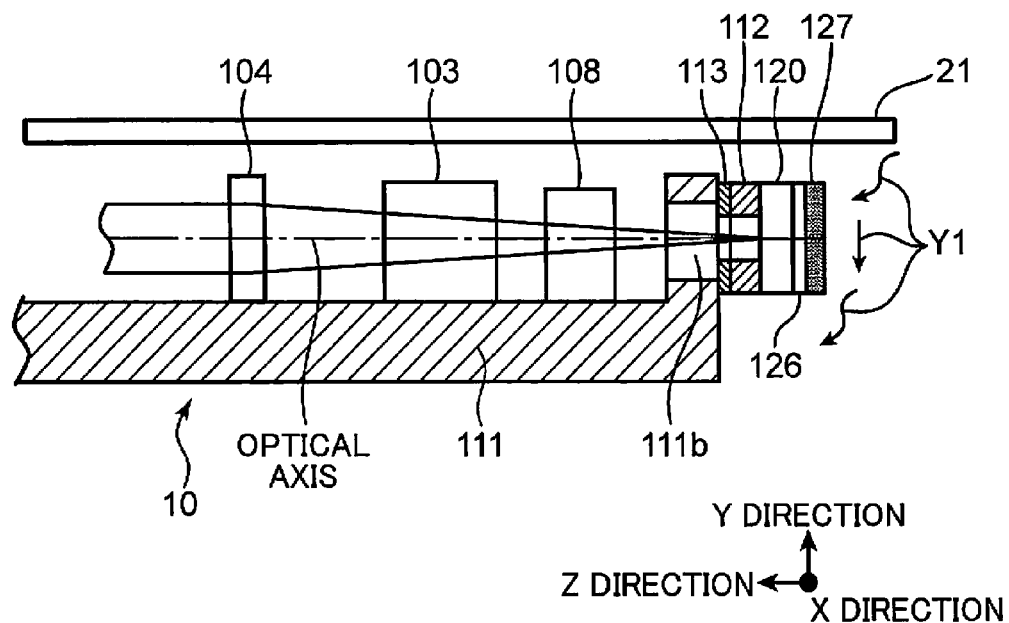
FIG. 8 is a cross section showing the partial configuration from the collimator lens of the optical head to the metal radiator plate in Embodiment 1 of the present invention.

FIG. 8 is a cross section showing the partial configuration from the collimator lens 104 of the optical head 10 to the metal radiator plate 127 in Embodiment 1 of the present invention. The optical base 111 fixes the optical member that is disposed on the light path of the luminous flux emitted from the semiconductor laser 101. The optical base 111 retains a semiconductor laser 101 (not shown), a diffraction grating 102 (not shown), a beam splitter 103, a collimator lens 104, an objective lens actuator 106 (not shown) which drives the objective lens 105, and a cylindrical lens 108. Meanwhile, the photodetector 120 is fixed to the metal holder 112. The metal holder 112 is configured to be adjustable in relation to the optical base 111 via an external jig (not shown) in the Z direction (optical axis direction) and on the X-Y plane (in-plane that is orthogonal to the optical axis) on the optical base 111.

The adjustment of the optical base 111 of the photodetector 120 and the optical axis is now explained. The position of the photodetector 120 on the X-Y plane is adjusted by causing the main beam 142, which enters the quartered light receiving region 140 of the photodetector 120, to enter the substantial center of the quartered light receiving region 140. Meanwhile, the position of the photodetector 120 in the Z direction is fine-adjusted so that the light receiving part 123 is disposed at the focal point position of the astigmatic difference in a state where the focal point of the objective lens 105 matches the recording layer of the optical disk 21. Consequently, the main beam 142 that enters the quartered light receiving region 140 becomes a circular shape, and the focus error signal is no longer subject to an offset. Here, the output of the focus error signal becomes 0 in a state where the focal point of the objective lens 105 matches the recording layer of the optical disk 21. Moreover, rotation adjustment ($\theta Z$) around the optical axis of the photodetector 120 is performed so that the first sub beam 143a and the second sub beam 143b enter the substantial center of the first sub beam light receiving region 141a and the second sub beam light receiving region 141b. Balance adjustment of the focus error signal is performed based on the positioning of the X-Y plane, detailed adjustment of the tracking error signal is performed based on the rotation adjustment ($\theta Z$) around the optical axis, and the focus offset of the focus error signal is adjusted based on the positioning of the Z direction.

As a result of the focus error signal being adjusted, the optical design where the first sub beam 143a and the second sub beam 143b substantially enter the first sub beam light receiving region 141a and the second sub beam light receiving region 141b is realized. Moreover, the overall photodetector 120 is subject to rotation adjustment around the optical axis center so that the amplitude of the tracking error signal becomes maximum. Consequently, the fine adjustment of the positional relationship of the first sub beam 143a and the second sub beam 143b, and of the first sub beam light receiving region 141a and the second sub beam light receiving region 141b is performed. The RF signal is detected by adding all luminous fluxes that were received by the quartered light receiving region 140. In addition, after the positioning of the photodetector 120 is performed, the metal holder 112 and the optical base 111 are bonded and fixed via the adhesion layer 113.

Moreover, the arrow Y1 of FIG. 8 shows the flow of the wind that is generated by rotation of the optical disk 21. As a result of disposing the metal radiator plate 127 to protrude outside the optical head 10 and additionally providing space at the periphery of the metal radiator plate 127, it is possible to achieve a configuration where the wind flows on the surface of the metal radiator plate 127. Consequently, it is possible to efficiently radiate the heat that is generated from the photodetector 120 into the air, and maintain the temperature rise of the photodetector 120 to be within the guaranteed temperature.

Note that the rotating direction of the optical disk 21 becomes the direction (X direction) that heads from the far side to the near side.

A modified example of the optical head 10 in Embodiment 1 of the present invention is now explained.

Figure 9:
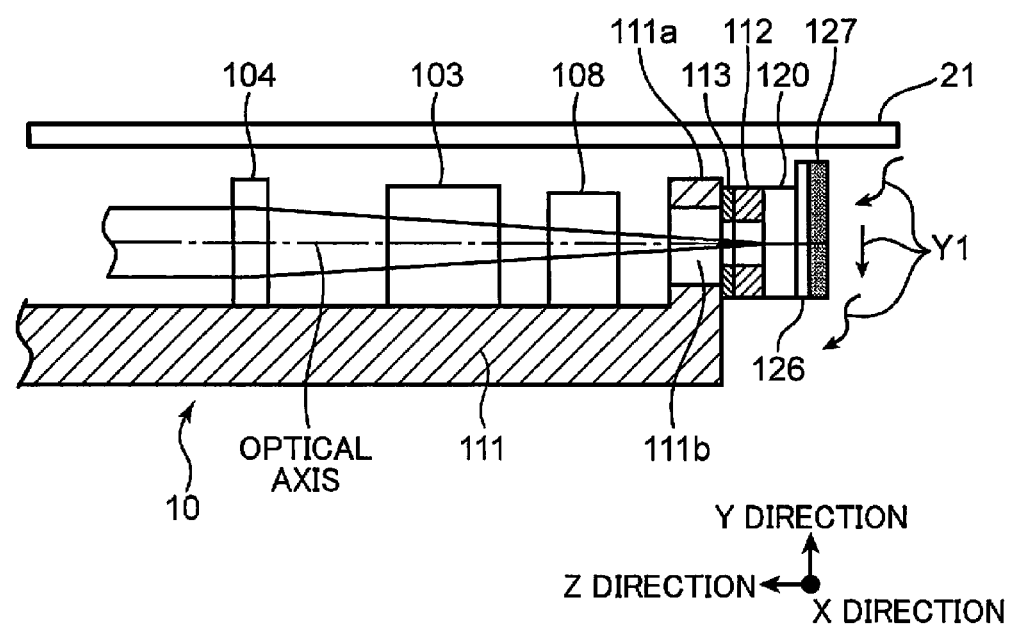
FIG. 9 is a diagram showing the configuration of the optical head in the first modified example of Embodiment 1 of the present invention.

FIG. 9 is a diagram showing the configuration of the optical head in the first modified example of Embodiment 1 of the present invention. As shown in FIG. 9, the configuration may also be such that the face of the FPC board 126 and the metal radiator plate 127 on the optical disk 21 side protrudes from the top face 111a of the optical base 111 toward the optical disk 21. As a result of the face of the FPC board 126 and the metal radiator plate 127 on the optical disk side protruding from the top face 111a of the optical base 111, it is possible to increase the amount of wind that passes over the surface of the metal radiator plate 127. Thus, it is possible to further increase the radiation efficiency.

Figure 10A:
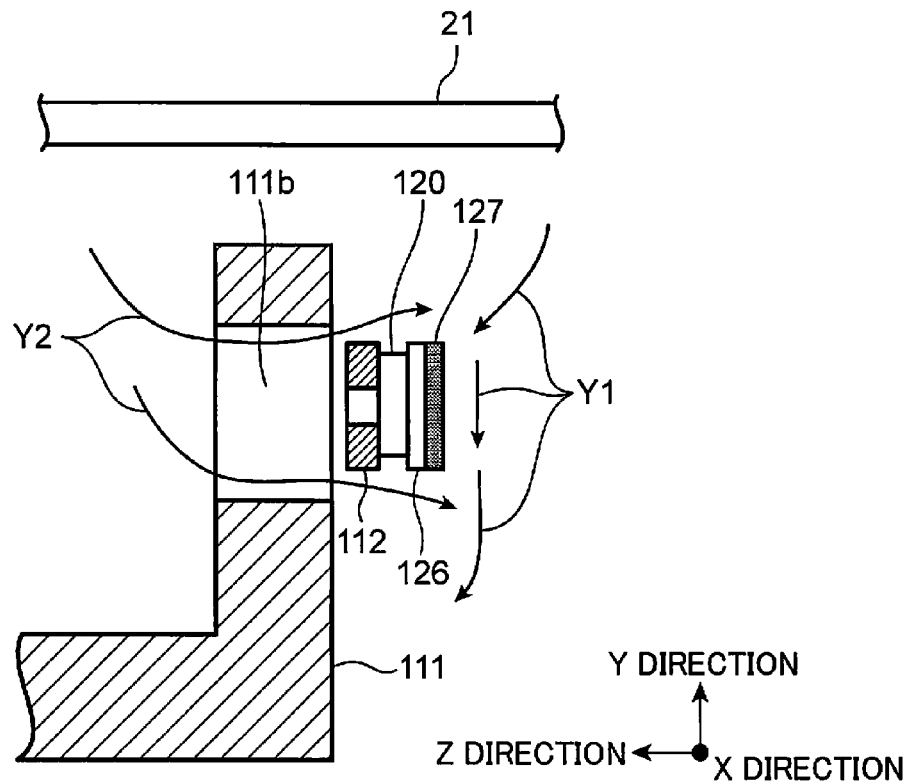
FIG. 10A is a diagram showing the configuration of the optical head in the second modified example of Embodiment 1 of the present invention.
Figure 10B:
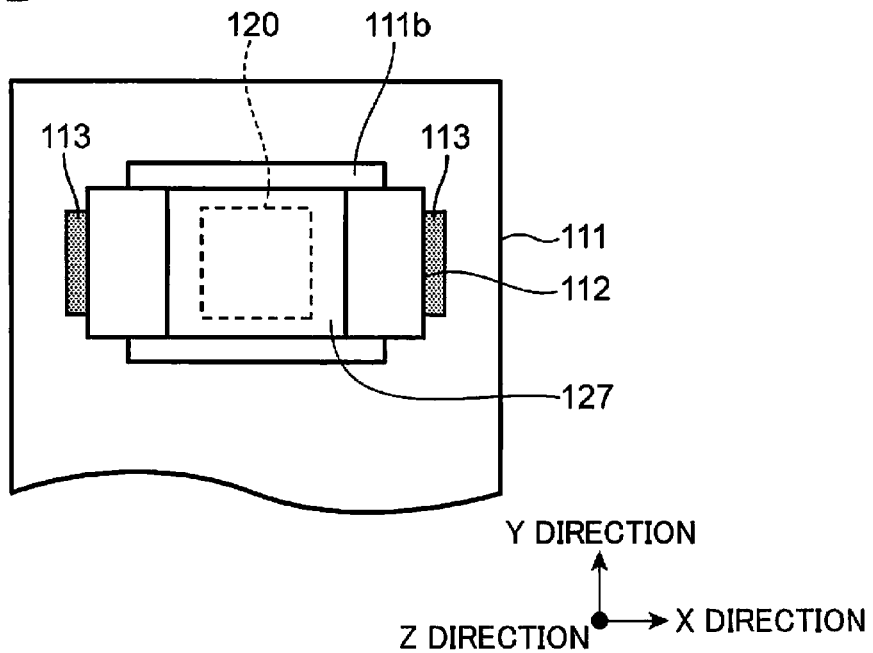
FIG. 10B is a diagram viewing the optical head shown in FIG. 10A from the metal radiator plate side.

FIG. 10A is a diagram showing the configuration of the optical head in the second modified example of Embodiment 1 of the present invention, and FIG. 10B is a diagram viewing the optical head shown in FIG. 10A from the metal radiator plate 127 side.

As shown in FIG. 10A and FIG. 10B, a substantially rectangular luminous flux entry hole 111b is formed at the portion where the metal holder 112 of the optical base 111 is fixed. The configuration may also be such that a gap exists between the face of the luminous flux entry hole 111b on the optical disk 21 side and the face of the metal holder 112 on the optical disk 21 side, and a gap exists between the face that is opposite to the face of the luminous flux entry hole 111b on the optical disk 21 side and the face that is opposite to the face of the metal holder 112 on the optical disk 21 side.

The length of the FPC board 126, the metal radiator plate 127 and the metal holder 112 in the Y direction (direction that is perpendicular to the tracking direction) may be shorter than the length of the luminous flux entry hole 111b of the optical base 111 in the Y direction. Consequently, a gap is formed between the side of the luminous flux entry hole 111b on the optical disk 21 side and the side of the metal holder 112 on the optical disk 21 side, and a gap is formed between the side that is opposite to the side of the luminous flux entry hole 111b on the optical disk 21 side and the side that is opposite to the face of the metal holder 112 on the optical disk 21 side.

According to the foregoing configuration, since wind that is generated by rotation of the optical disk 21 comes in contact with the metal radiator plate 127 (arrow Y1), and passes through the substantially rectangular luminous flux entry hole 111b of the optical base 111 (arrow Y2), it is possible to efficiently radiate the heat transferred from the photodetector 120 to the metal holder 112 and the optical base 111. Thus, it is possible to further improve the radiation efficiency of the photodetector 120. Here, the optical base 111 is desirably made of metal such as zinc, aluminum or magnesium.

Moreover, the fixation (bonding) of the metal holder 112 and the optical base 111 is performed on either end of the luminous flux entry hole 111b of the optical base 111 in the X direction. In other words, the length of the metal holder 112 in the X direction is longer than the length of the luminous flux entry hole 111b in the X direction, and the adhesion layer 113 for bonding the metal holder 112 and the optical base 111 is formed between both edges of the metal holder 112 in the X direction and the optical base 111.

Note that, in the second modified example of Embodiment 1, a gap exists between the face of the luminous flux entry hole 111b on the optical disk 21 side and the face of the metal holder 112 on the optical disk 21 side, and a gap exists between the face that is opposite to the face of the luminous flux entry hole 111b on the optical disk 21 side and the face that is opposite to the face of the metal holder 112 on the optical disk 21 side. However, the present invention is not limited thereto, and a gap may exist only between the face of the luminous flux entry hole 111b on the optical disk 21 side and the face of the metal holder 112 on the optical disk 21 side, or a gap may exist only between the face that is opposite to the face of the luminous flux entry hole 111b on the optical disk 21 side and the face that is opposite to the face of the metal holder 112 on the optical disk 21 side.

In addition, with the second modified example of Embodiment 1, the length of the metal holder 112 in the Y direction is made to be shorter than the length of the luminous flux entry hole 111b of the optical base 111 in the Y direction. However, the present invention is not limited thereto, and the length of the metal holder 112 in the X direction may be made to be shorter than the length of the luminous flux entry hole 111b of the optical base 111 in the X direction. In the foregoing case, a gap is formed on either side of the luminous flux entry hole 111b in the X direction.

Figure 11:
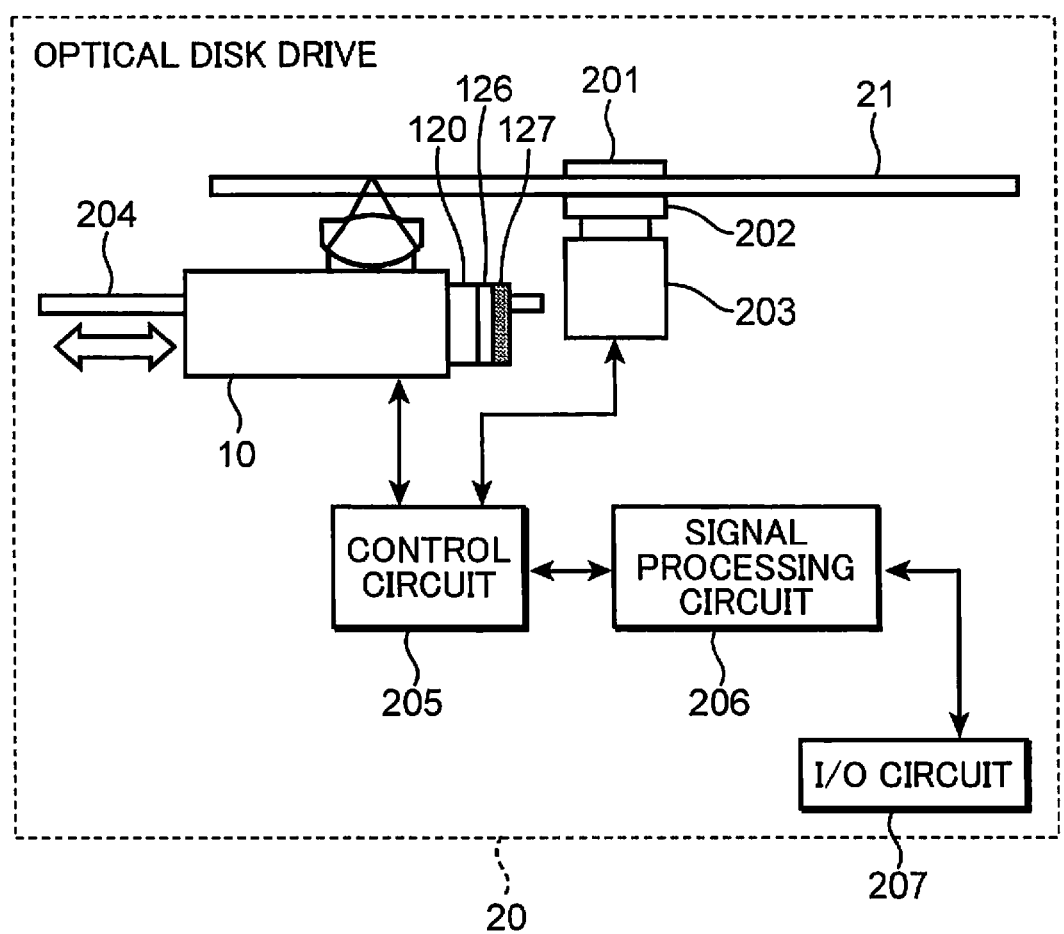
FIG. 11 is a diagram showing the configuration of the optical disk drive in Embodiment 1 of the present invention.

FIG. 11 is a diagram showing the configuration of the optical disk drive in Embodiment 1 of the present invention.

In FIG. 11, the optical disk drive 20 comprises an optical head 10, a motor 203, a traverse 204, a control circuit 205, a signal processing circuit 206 and an I/O circuit 207.

The optical disk 21 is fixed by being sandwiched by the damper 201 and the turntable 202, and rotated by the motor (rotating system) 203. The motor 203 rotationally drives the optical disk 21. The optical head 10 is located on the traverse (transfer system) 204. The traverse 204 moves the optical head 10 in the radial direction of the optical disk 21. Consequently, the irradiated light can move from the inner periphery to the outer periphery of the optical disk 21.

The control circuit 205 controls the optical head 10 and the motor 203. The control circuit 205 performs focus control, tracking control, traverse control and rotation control of the motor 203 based on signals received from the optical head 10. Moreover, the signal processing circuit 206 reproduces information from the reproduction signal (RF signal) and outputs this to the I/O circuit 207, or sends the recording signal input from the I/O circuit 207 to the optical head 10 through the control circuit 205.

Note that, in this embodiment, the optical disk drive 20 corresponds to an example of the optical information device, the optical head 10 corresponds to an example of the optical head, the motor 203 corresponds to an example of the drive part, and the control circuit 205 corresponds to an example of the control unit.

Figure 12:
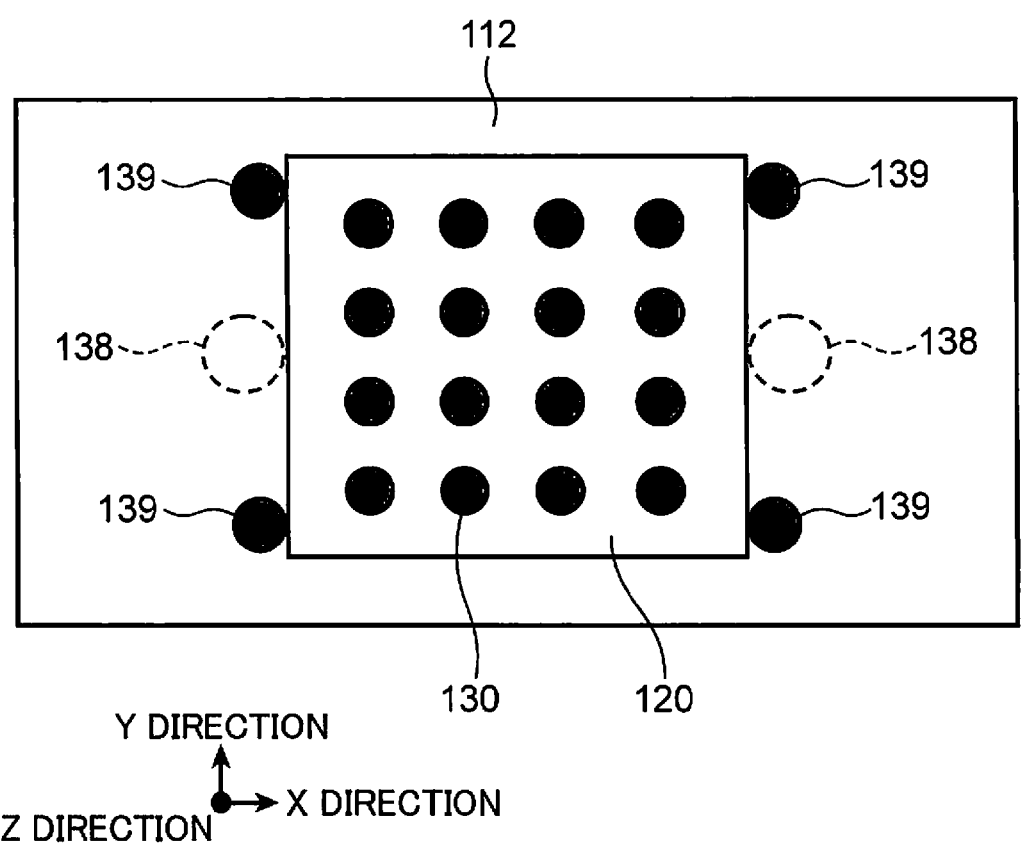
FIG. 12 is a diagram explaining the method of fixing the photodetector and the metal holder in Embodiment 1 of the present invention.

FIG. 12 is a diagram explaining the method of fixing the photodetector 120 and the metal holder 112 in Embodiment 1 of the present invention. Positioning of the photodetector 120 on the X-Y plane, positioning in the Z direction, and rotation adjustment around the Z axis (optical axis) are performed, and, after positioning is performed with the external jig 138, the metal holder 112 and the photodetector 120 are bonded and fixed via the adhesive 139. The metal holder 112 is configured, for example, from metal such as zinc, aluminum, copper or SPCC, and radiates heat from the photodetector 120.

The optical base 111 is made of resin or metal. From the perspective of radiation of the photodetector 120, the optical base 111 is made of metal. Here, the adhesion layer 113 between the metal holder 112 and the optical base 111 in FIG. 8A is desirably an adhesive with thermal conductivity, or configured so that a separate heat transfer agent is filled between the metal holder 112 and the optical base 111.

Figure 13A:
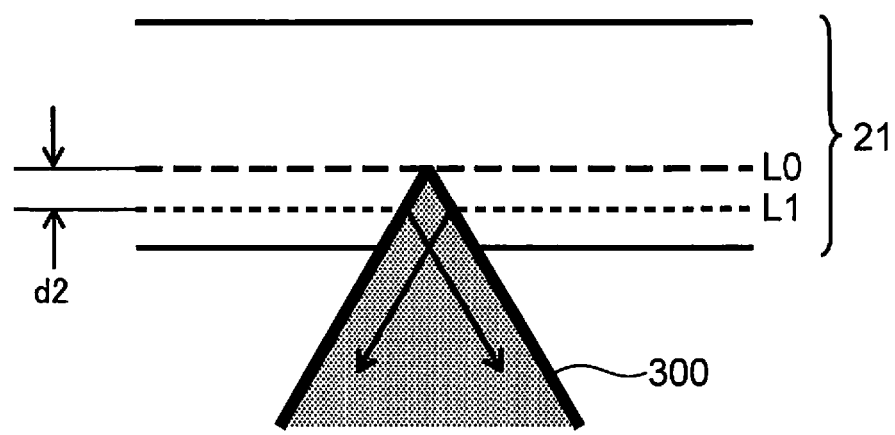
FIG. 13A is a schematic diagram explaining the surface reflection from the other layer in a dual-layer optical disk.
Figure 13B:
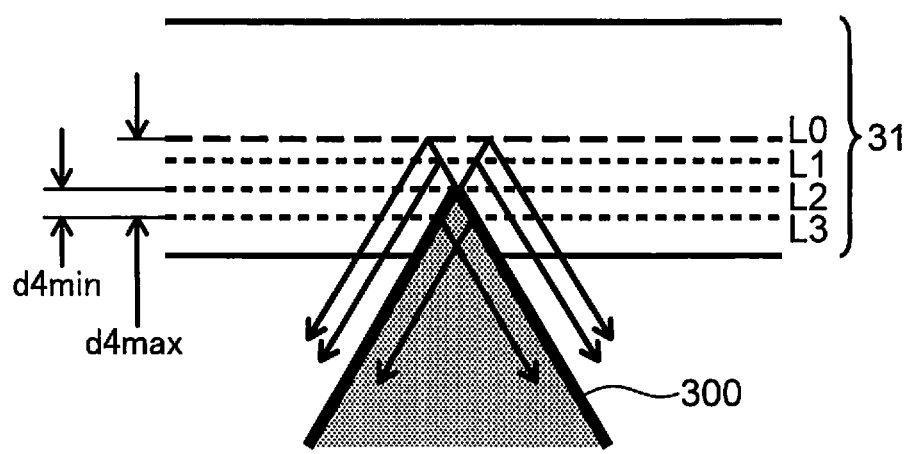
FIG. 13B is a schematic diagram explaining the surface reflection from other layers in a multilayer optical disk.

FIG. 13A is a schematic diagram explaining the surface reflection from the other layer in a dual-layer optical disk 21, and FIG. 13B is a schematic diagram explaining the surface reflection from other layers in a multilayer optical disk 31. If the reflected light from other layers enters the first sub beam light receiving region 141a and the second sub beam light receiving region 141b, an offset occurs in the tracking error signal and the quality of the tracking servo will deteriorate. FIG. 13A shows the configuration of the optical disk 21 having two recording layers, and the generation of stray light from the other layers when the convergent light 300 is focused on a certain recording layer. In FIG. 13A, the focal point is connected to the first recording layer L0 and, in the foregoing case, the light reflected by the second recording layer L1 becomes the stray light from other layers.

Moreover, FIG. 13B shows the configuration of the optical disk 31 having four recording layers, and the generation of stray light from the other layers when the convergent light 300 is focused on a certain recording layer. In FIG. 13B, the focal point is connected to the third recording layer L2, and the light reflected by the first recording layer L0, the second recording layer L1 and the fourth recording layer L3 becomes the stray light from other layers.

In the dual-layer optical disk 21 of FIG. 13A, the interlayer spacing d2 between the first recording layer L0 and the second recording layer L1 is defined as 25±5 µm as the standard, and is 20 µm at minimum and is 30 µm at maximum. Thus, the size of the stray light from other layers on the photodetector 120 is restricted to a certain extent.

Meanwhile, in the optical disk 31 having three or more recording layers such as the four layers of FIG. 13B, it is highly likely that the interlayer spacing d4 min with the smallest pitch will be smaller in comparison to the dual-layer optical disk 21. Note that, in FIG. 13B, as an example, the interlayer spacing between the third recording layer L2 and the fourth recording layer L3 is set as the interlayer spacing d4 min. Moreover, the interlayer spacing d4 max in which the pitch is the most distant will become greater in comparison to the dual-layer optical disk 21. Here, the size of the stray light from other layers in the photodetector 120 will become considerably greater in comparison to the dual-layer optical disk 21. Note that, in FIG. 13B, as an example, the interlayer spacing between the first recording layer L0 and the fourth recording layer L3 is set as the interlayer spacing d4 max.

Accordingly, in order to detect a stable tracking error signal upon recording or reproducing information to or from the multilayer optical disk 31, it is necessary to prevent the stray light from other layers from leaking into the first sub beam light receiving region 141a and the second sub beam light receiving region 141b. In order to achieve this, it is necessary to increase the magnification (lateral magnification β) of the detection optical system, and considerably distance the quartered light receiving region 140 which receives the main beam 142, and the first sub beam light receiving region 141a and the second sub beam light receiving region 141b which receive the first sub beam 143a and the second sub beam 143b.

Figure 14A:
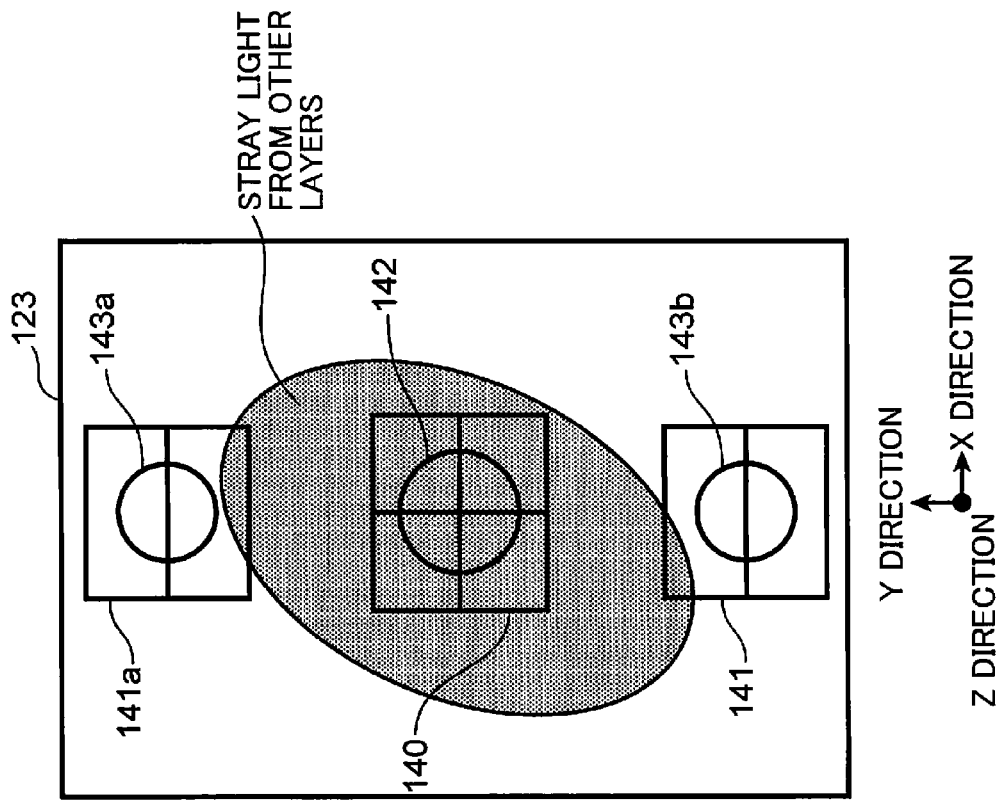
FIG. 14A is a diagram showing the distance between the main beam and the sub beam on the photodetector of the conventional optical head and the relation with the stray light from other layers.
Figure 14B:
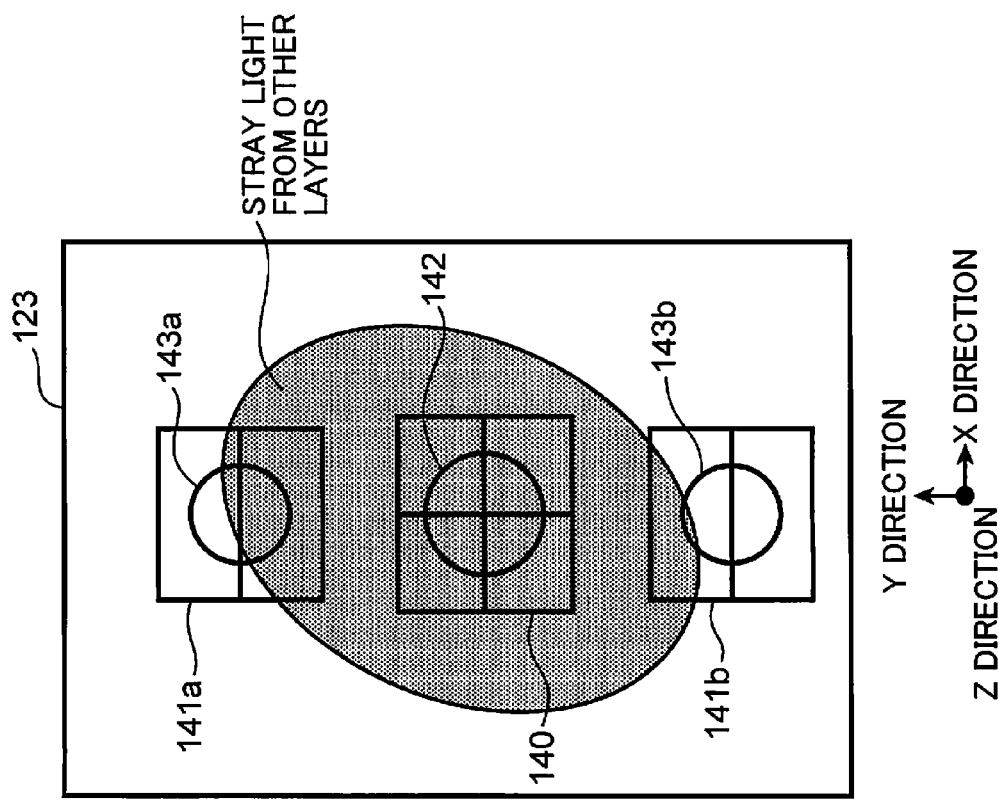
FIG. 14B is a diagram showing the distance between the main beam and the sub beam on the photodetector of the optical head and the relation with the stray light from other layers in Embodiment 1 of the present invention.

FIG. 14A is a diagram showing the distance between the main beam and the sub beam on the photodetector of the conventional optical head and the relation with the stray light from other layers, and FIG. 14B is a diagram showing the distance between the main beam and the sub beam on the photodetector of the optical head and the relation with the stray light from other layers in Embodiment 1 of the present invention.

The distance between the main beam 142 and the first sub beam 143a (or the second sub beam 143b) on the photodetector 120 is a value that is obtained by multiplying the lateral magnification of the detection optical system to the pitch between the main beam 142 and the first sub beam 143a (or the second sub beam 143b) focused on the track of the recording layer of the optical disk 21.

For example, assuming that the pitch between the main beam and the sub beam on the track of the recording layer is 20 µm, and the lateral magnification of the detection optical system is roughly 6 times, the distance between the main beam 142 and the first sub beam 143a (or the second sub beam 143b) on the photodetector 120 will be approximately 120 µm. Nevertheless, if the size of the stray light from other layers is approximately 150 µm upon recording or reproducing information to or from the multilayer optical disk, the lateral magnification of the detection optical system needs to be substantially 10 times in order to detect a stable tracking error signal. The distance between the main beam 142 and the first sub beam 143a (or the second sub beam 143b) in the foregoing case will be approximately 200 µm.

Here, although the pitch between the main beam 142 and the first sub beam 143a (or the second sub beam 143b) on the track of the recording layer of the optical disk 21 was set to substantially 20 µm, since this value affects the offset of the tracking error during movement from the inner periphery to the outer periphery of the optical disk 21, it is a value that is set in advance for each piece of equipment, and is generally set to a value within the range of 10 µm to 20 µm.

Meanwhile, in order to realize the downsizing of the optical head 10, it is necessary to reduce the size of the detection optical system, and the detection optical system needs to be downsized upon giving consideration to the influence of the stray light from other layers. It is necessary to increase the magnification of the detection optical system in consideration of the adverse effect of the stray light from other layers. As a result of reducing the focal point distance of the objective lens 105 and reducing the focal point distance of the detection optical system, the detection optical system can be downsized only with the objective lens 105 and the collimator lens 104 while maintaining the lateral magnification. Here, it will be difficult to configure the metal holder 112 holding the photodetector 120 or the aperture for blocking the stray light that enters the light receiving part 123 as a separate member in terms of space.

As shown in FIG. 14B, in order to distance the quartered light receiving region 140 and the first sub beam light receiving region 141a and the first sub beam light receiving region 141b so that stray light from other layers does not enter the first sub beam light receiving region 141a and the first sub beam light receiving region 141b, the lateral magnification of the detection optical system that is configured from the objective lens 105, the collimator lens 104 and the concave lens of the cylindrical lens 108 is desirably within the range of approximately 14 times to 16 times.

As a result of increasing the lateral magnification of the detection optical system and distancing the quartered light receiving region 140 and the first sub beam light receiving region 141a and the first sub beam light receiving region 141b so that stray light from other layers does not enter the first sub beam light receiving region 141a and the first sub beam light receiving region 141b, it is possible to obtain a stable tracking error signal that is free from offset and interference caused by stray light.

Moreover, since the DC level of the tracking error signal will no longer change due to the interference of the reflected light from the target layer and the stray light from other layers, it is possible to realize stable recording performance and reproduction performance without degrading the performance of the tracking servo.

Since the photodetector 120 comprises a glass package 125, which is not made of resin, and a heat transfer adhesion layer 124, the distance between the quartered light receiving region 140 and the first sub beam light receiving region 141a and the first sub beam light receiving region 141b will increase. Thus, the photodetector 120 can be considerably downsized even if the area of the silicon semiconductor 121 increases.

Based on the configuration of efficiently transferring the heat generated from the photodetector 120 to the metal holder 112 and the metal radiator plate 127 and the configuration of using the wind that is generated by the rotation of the optical disk 21 and radiating heat from the metal radiator plate 127 into air, it is possible to reduce the temperature rise of the photodetector 120.

Moreover, according to the foregoing radiation configuration, it is possible to realize superior radiation characteristics and realize an optical head with superior servo performance and reliability even when the capacity of the photodetector 120 is small.

In addition, it is possible to configure the photodetector 120 to be compact and thin, and downsizing is enabled while increasing the magnification of the return detection optical system of the optical head 10. Consequently, the optical head 10 can be downsized, and it is possible to realize an optical disk drive 20 capable of being downsized and compatible with a multilayer optical disk.

Moreover, as a result of disposing a highly flat metal radiator plate 127 on a face that is opposite to the face for mounting the photodetector 120 of the FPC board 126, the FPC board 126 and the photodetector 120 can be positioned accurately during the mounting of the photodetector 120, and highly accurate mounting can be achieved since the warping or deformation of the FPC board 126 is prevented. Here, the size of the photodetector 120 in the X direction, Y direction and Z direction will become approximately 2.5 mm, approximately 2.5 mm and approximately 1 mm, respectively, and the pitch of the respective signal output units 130 can be made extremely small; for instance, 0.4 mm to 0.5 mm. Moreover, the flatness of the metal radiator plate 127 is desirably 20 μm or less. Moreover, the metal radiator plate 127 is desirably an aluminum or copper flat plate from the perspective of coefficient of thermal conductivity.

Note that, in Embodiment 1, the FPC board 126 is a dual-layer structure, but it can also be a single layer or three layers or more. Moreover, although the metal radiator plate 127 and the FPC board 126 are fixed via an adhesion layer, the configuration may also be such that a heat-transfer agent is partially filled, or an adhesive having thermal conductivity can also be used.

Figure 15A:
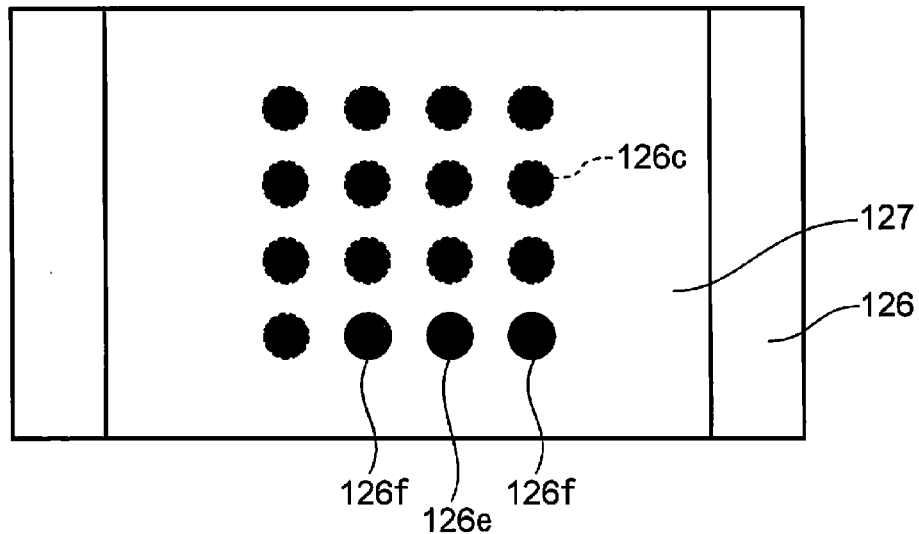
FIG. 15A is a bottom view showing the configuration of the FPC board of the optical head and the metal radiator plate in the third modified example of Embodiment 1 of the present invention.
Figure 15B:
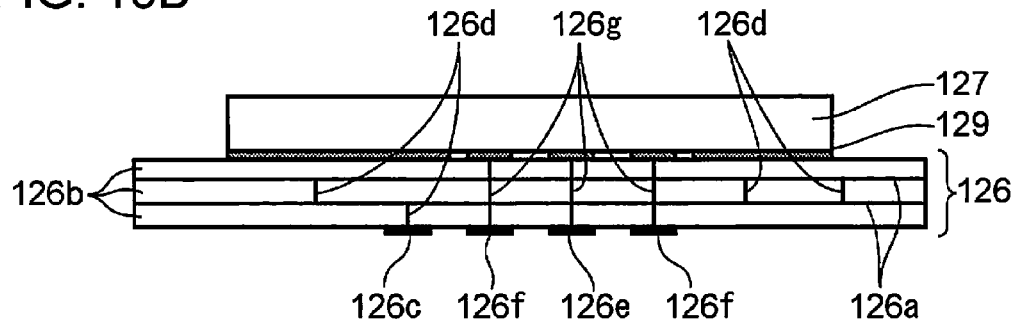
FIG. 15B is a cross section showing the configuration of the FPC board of the optical head and the metal radiator plate in the third modified example of Embodiment 1 of the present invention.
Figure 15C:
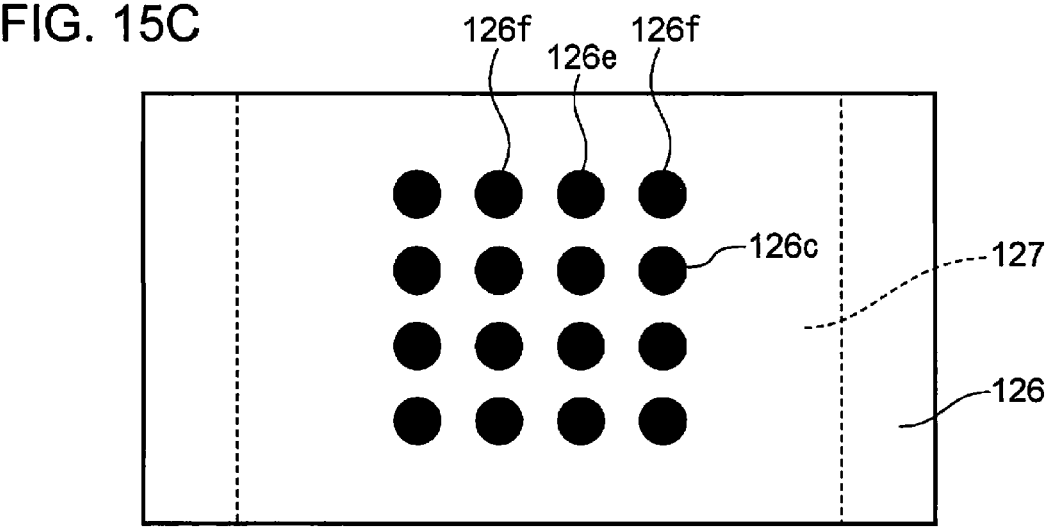
FIG. 15C is a front view showing the configuration of the FPC board of the optical head and the metal radiator plate in the third modified example of Embodiment 1 of the present invention.

FIG. 15A to FIG. 15C are diagrams showing the configuration of the FPC board 126 of the optical head and the metal radiator plate 127 in the third modified example of Embodiment 1 of the present invention. FIG. 15A is a bottom view showing the configuration of the FPC board of the optical head and the metal radiator plate in the third modified example of Embodiment 1 of the present invention, FIG. 15B is a cross section showing the configuration of the FPC board of the optical head and the metal radiator plate in the third modified example of Embodiment 1 of the present invention, FIG. 15C is a front view showing the configuration of the FPC board of the optical head and the metal radiator plate in the third modified example of Embodiment 1 of the present invention.

In the heat transfer from the land part 126c of the FPC board 126 shown in FIG. 4 to the metal radiator plate 127, the coefficient of thermal conductivity will decrease due to members such as the resin layer 126b and the adhesion layer 129 that are made of materials other than metal.

Thus, as shown in FIG. 15A to FIG. 15C, a GND (ground) terminal 126e and a dummy terminal 126f are formed on the face of the FPC board 126 to which the photodetector 120 is mounted, the GND (ground) terminal 126e and the dummy terminal 126f and the metal radiator plate 127 are wired via the dummy via holes 126g, and the dummy via hole 126g is caused to come in contact with the metal radiator plate 127 via solder plating or the like. The GND terminal 126e is a terminal for grounding, and the dummy terminal 126f is a terminal that is provided for transferring heat, and not for transferring signals as with the land part 126c. Moreover, the dummy via holes 126g transfer the heat that is generated in the light receiving part 123 and the operation circuit 122 from the signal output unit 130 to the metal radiator plate 127.

Note that, in this embodiment, the dummy via hole 126g corresponds to an example of the via hole.

According to the foregoing configuration, the heat that is generated in the photodetector 120 is transferred to the metal radiator plate 127 via the signal output unit 130, the GND terminal 126e, the dummy terminal 126f and the dummy via hole 126g. Thus, it is possible to even more efficiently transfer the heat that is generated in the photodetector 120 to the metal radiator plate 127.

Here, the amount of heat generation of the operation circuit 122 shown in FIG. 2C is greater than the amount of heat generation of the light receiving part 123. Thus, it is possible to further improve the radiation efficiency by increasing the density of the dummy terminal 126f to come in contact with the operation circuit 122. In other words, the ratio of distribution of the dummy via holes 126g relative to a surface area of the operation circuit 122 is higher than the ratio of distribution of the dummy via holes 126g relative to a surface area of the light receiving part 123. In addition, since dummy via holes for heat transfer to be connected to the operation circuit 122 are formed inside the silicon semiconductor 121, and the dummy terminal 126f and the operation circuit 122 become directly connected via the dummy via holes 126g, it is possible to further improve the heat transfer efficiency.

Note that, in Embodiment 1, although the photoconductor 120 is fixed to the metal holder 112, the present invention is not limited thereto, and the metal holder 112 can be omitted, and the configuration may be such that the photodetector 120 is directly bonded and fixed to the optical base 111. Here, the optical base 111 is desirably made of metal such as aluminum or zinc.

Note that, in Embodiment 1, although the metal holder 112 and the photodetector 120 are disposed at a position where wind, which is generated by rotation of the optical disk 21, comes in contact therewith as much as possible so as to radiate heat from the metal holder 112 and the photodetector 120 also into the air, the configuration may also be such that the metal holder 112 and the photodetector 120 are hidden inside the optical head 10 and do not come in direct contact with the wind.

Note that, in Embodiment 1, although the material of the package 125 is glass, it goes without saying that it is not limited to a specific material.

Embodiment 2

The optical head in Embodiment 2 of the present invention is now explained.

Figure 16:
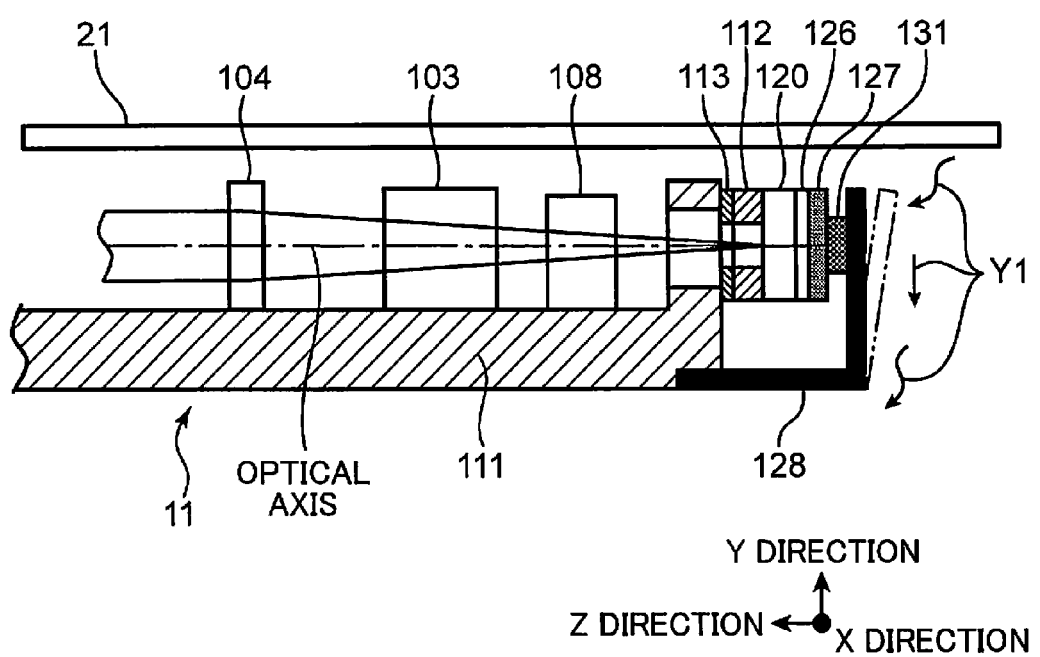
FIG. 16 is a diagram showing the configuration of the optical head in Embodiment 2 of the present invention.

FIG. 16 is a diagram showing the configuration of the optical head in Embodiment 2 of the present invention. Note that FIG. 16 shows the partial configuration from the collimator lens 104 to the metal cover 128 of the optical head 11 in Embodiment 2, and the remaining configuration is the same as the configuration of the optical head 10 in Embodiment 1.

Embodiment 2 differs from Embodiment 1 in terms of the radiation configuration of the photodetector 120. In Embodiment 1, the heat generated in the photodetector 120 was radiated in the air from the surface of the metal radiator plate 127 by using the wind that is generated by rotation of the optical disk 21. Meanwhile, in Embodiment 2, as shown in FIG. 16, a metal cover 128 made of aluminum, copper, SPCC, stainless or the like is fixed to the optical base 111, and a heat-transfer agent 131 is filled between the metal cover 128 and the metal radiator plate 127. Consequently, the heat generated in the photodetector 120 is transferred to the metal cover 128. Note that the coefficient of thermal conductivity of the heat-transfer agent 131 is desirably 2 W/m·K or more.

The optical head 11 shown in FIG. 16 comprises a semiconductor laser 101, a diffraction grating 102, a beam splitter 103, a collimator lens 104, an objective lens 105, an objective lens actuator 106, a cylindrical lens 108, a metal holder 112, a photodetector 120, an FPC board 126, a metal radiator plate 127 and a metal cover 128.

The metal cover 128 is fixed to the optical base 111, and heat from the metal radiator plate 127 is transferred thereto. The metal cover 128 is formed in an L-shape, and includes a first surface that is fixed to the optical base 111, and a second surface, which has a predetermined angle relative to the first surface, that is fixed to the metal radiator plate 127 via the heat-transfer agent 131. Moreover, the metal cover 128 is disposed at a position where the wind, which is generated by rotation of the optical disk 21, directly comes in contact therewith. The wind from the optical disk 21 passes on the surface of the metal cover 128. Note that the rotating direction of the optical disk 21 becomes the direction (X direction) that heads from the far side to the near side.

Moreover, the metal cover 128 is disposed to be exposed in the air on the outside of the optical head 10. Thus, achieved is a configuration where the wind, which is generated by rotation of the optical disk 21, comes in contact with the surface of the metal cover 128, and passes through from the optical disk 21 side to the lower side, and the heat can be efficiently radiated in the air.

Note that, in this embodiment, the metal cover 128 corresponds to an example of the cover member.

According to this kind of radiation configuration, it is possible to even more efficiently radiate the heat generated in the photodetector 120 in the air based on the metal cover 128, and reduce the temperature rise of the photodetector 120. Moreover, it is possible to inhibit the heat generation from the photodetector itself to a temperature rise of 10° C. or less. Thus, it is possible to realize high speed recording of the multilayer optical disk, and realize a photoconductor that is compatible with a compact optical disk drive (optical information device). Moreover, it is possible to realize a compact, high performance and highly reliable optical head and optical disk drive (optical information device).

Note that, in Embodiment 2, although the heat is transferred via the heat-transfer agent 131 provided between the metal radiator plate 127 and the metal cover 128, it is also possible to cause the metal cover 128 to come in contact with the metal radiator plate 127 via a leaf spring or the like.

In addition, a part of the metal cover 128 can also be inclined obliquely as shown with the two-dot chain line of FIG. 16. In other words, the metal cover 128 is inclined obliquely relative to a face that is perpendicular to the optical axis of the luminous flux that enters the photodetector 120, and the edge of the metal cover 128 on the optical disk 21 side broadens in a direction that recedes from the metal radiator plate 127. According to the foregoing configuration, it is possible to increase the radiation efficiency based on a configuration in which more wind passes on the surface of the metal cover 128.

Figure 17A:
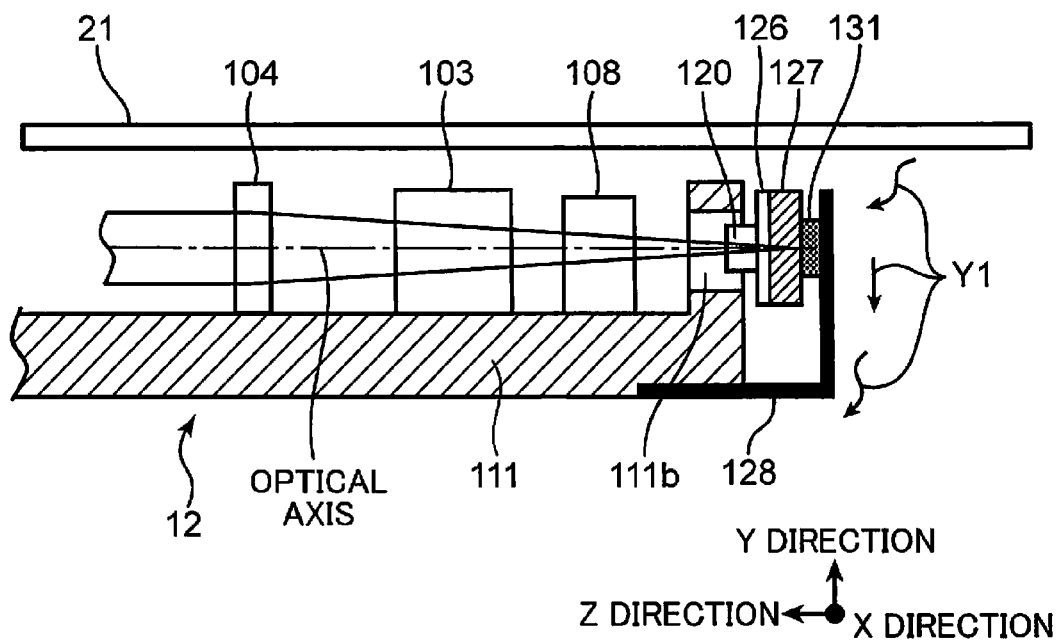
FIG. 17A is a diagram showing the configuration of the optical head in a modified example of Embodiment 2 of the present invention.
Figure 17B:
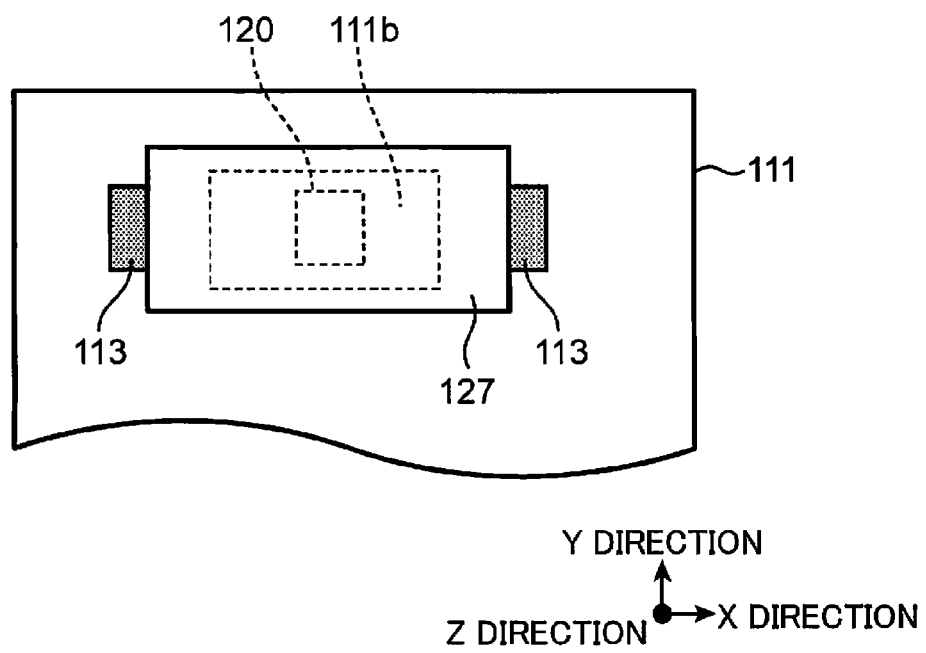
FIG. 17B is a diagram viewing the optical head shown in FIG. 17A from the metal cover side.

FIG. 17A is a diagram showing the configuration of the optical head in a modified example of Embodiment 2 of the present invention, and FIG. 17B is a diagram viewing the optical head shown in FIG. 17A from the metal cover 128 side. Note that, in FIG. 17B, the metal cover 128 and the heat-transfer agent 131 are omitted. Moreover, FIG. 17A shows the partial configuration from the collimator lens 104 of the optical head 12 to the metal cover 128 in the modified example of Embodiment 2, and the remaining configuration is the same as the configuration of the optical head 10 in Embodiment 1.

In foregoing Embodiment 2, the photodetector 120 is fixed to the metal holder 112, but the configuration may also be such that the metal holder 112 is omitted, and the photodetector 120 is directly bonded and fixed to the optical base 111.

The optical head 12 shown in FIG. 17A comprises a semiconductor laser 101, a diffraction grating 102, a beam splitter 103, a collimator lens 104, an objective lens 105, an objective lens actuator 106, a cylindrical lens 108, a photodetector 120, an FPC board 126, a metal radiator plate 127 and a metal cover 128.

The photodetector 120 is fixed to the FPC board 126. The photodetector 120 is smaller than the luminous flux entry hole 111b formed on the optical base 111 and the FPC board 126 is larger than the luminous flux entry hole 111b. An adhesion layer 113 for bonding the FPC board 126 to the optical base 111 is provided between the FPC board 126 and the optical base 111. For example, the adhesion layer 113 is provided to both edges of the FPC board 126 in the X direction.

Accordingly, by fixing the FPC board 126, to which the photodetector 120 is fixed, to the optical base 111, it is possible to expose and radiate the photodetector 120 in the air. Moreover, it is possible to cause the wind, which is generated by rotation of the optical disk 21, to directly come in contact with the photodetector 120, and inhibit the temperature rise of the photodetector 120.

Note that, although the optical head 12 comprises the metal cover 128 in the modified example of Embodiment 2, the present invention is not limited thereto, and the optical head 12 does not need to comprise the metal cover 128.

Figure 18:
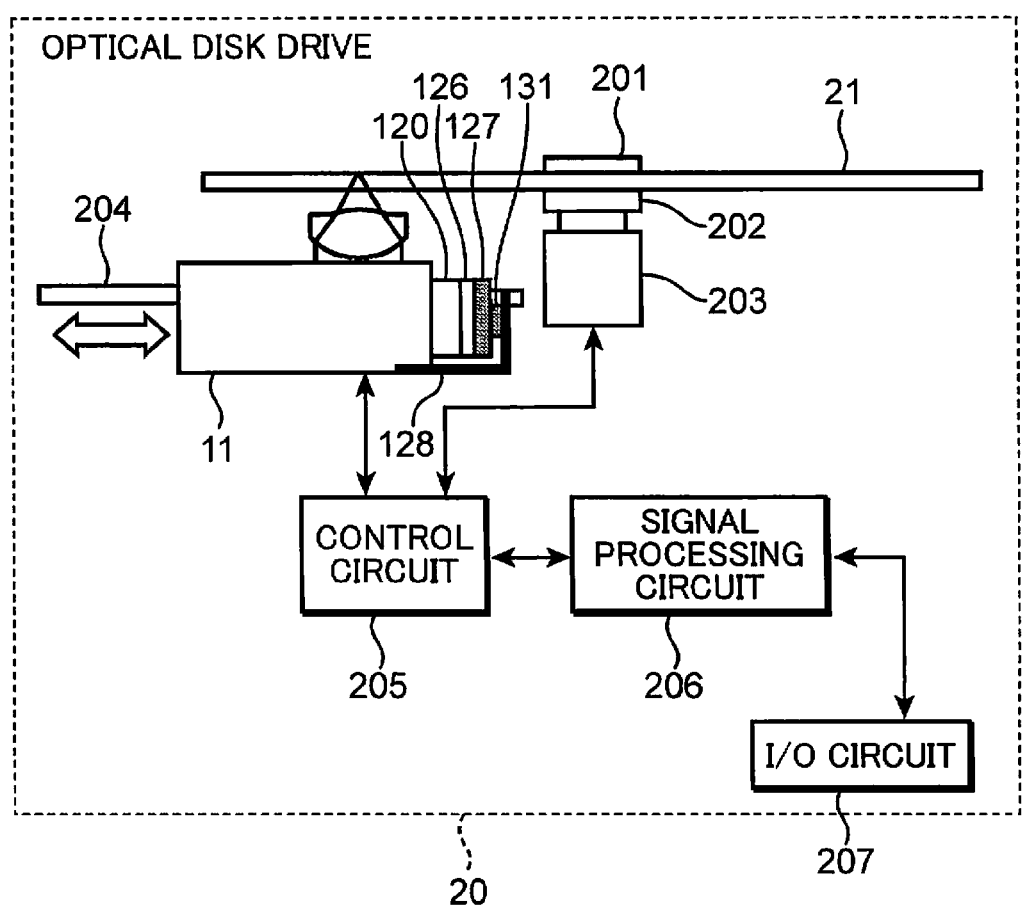
FIG. 18 is a diagram showing the configuration of the optical disk drive in Embodiment 2 of the present invention.

FIG. 18 is a diagram showing the configuration of the optical disk drive in Embodiment 2 of the present invention. In FIG. 18, the optical disk drive 22 comprises an optical head 11, a motor 203, a traverse 204, a control circuit 205, a signal processing circuit 206 and an I/O circuit 207. The optical disk drive 20 corresponds to an example of the optical information device.

The optical disk drive 22 in Embodiment 2 is different only with respect to the optical head 10 of the optical disk drive 20 in Embodiment 1 being changed to the optical head 11. Thus, the operation of the optical disk drive 22 in Embodiment 2 is the same as the optical disk drive 20 in Embodiment 1, and the explanation thereof is omitted.

Embodiment 3

The optical head in Embodiment 3 of the present invention is now explained.

The optical head in Embodiment 3 differs from Embodiment 1 and Embodiment 2 in terms of the method of detecting the tracking error signal. While Embodiment 1 and Embodiment 2 detect the tracking error signal based on the so-called 3-beam method that uses the diffraction grating 102, Embodiment 3 detects the tracking error signal based on the so-called 1 beam method (APP (advanced push-pull) method) that uses a hologram element. Moreover, the arrangement of the respective light receiving regions of the light receiving part 123 is different pursuant to the change in the method of detecting the tracking error signal.

Figure 19:
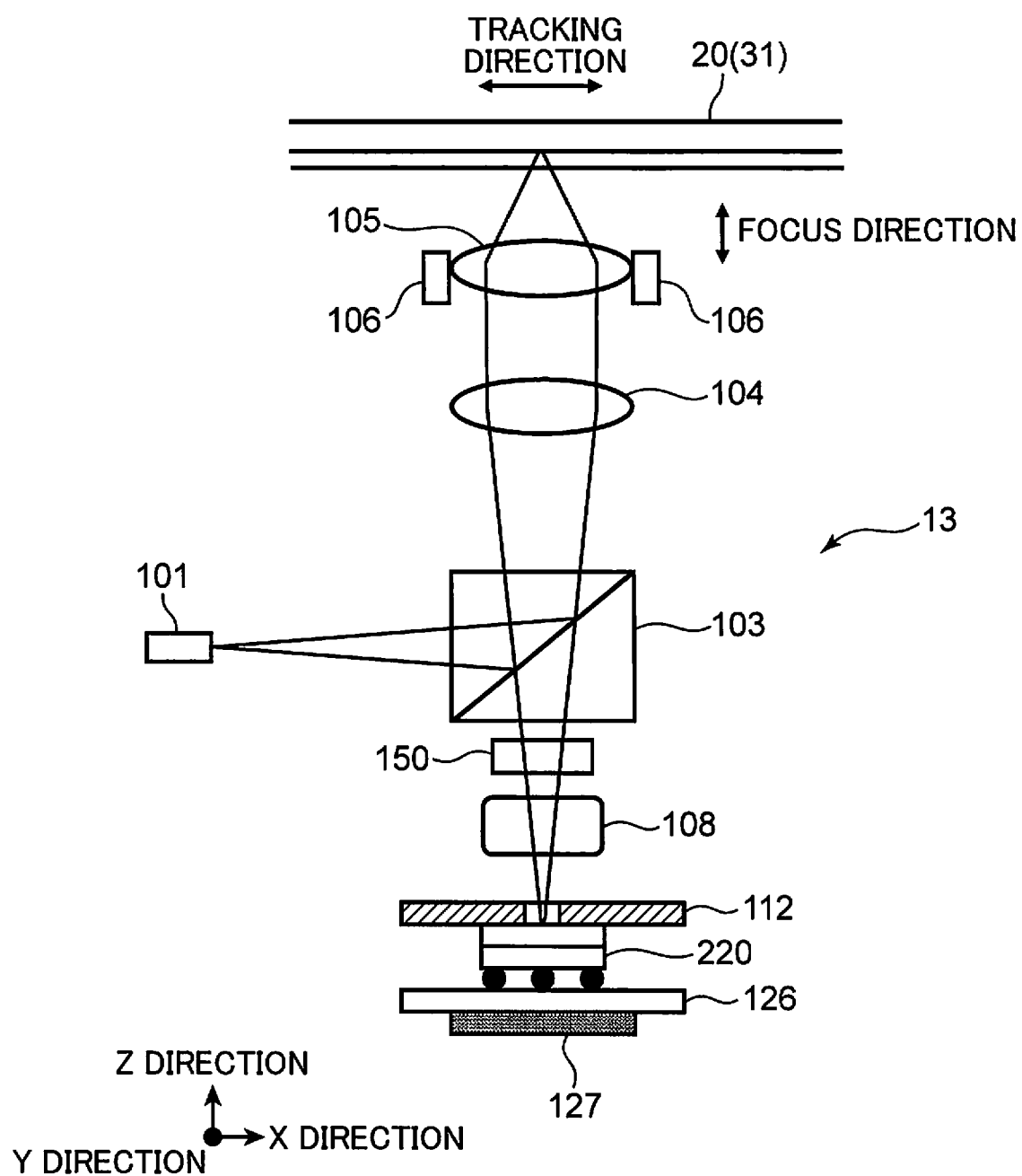
FIG. 19 is a diagram showing the configuration of the optical system of the optical head in Embodiment 3 of the present invention.

FIG. 19 is a diagram showing the configuration of the optical system of the optical head in Embodiment 3 of the present invention. In FIG. 19, the optical head 13 comprises a semiconductor laser 101, a beam splitter 103, a collimator lens 104, an objective lens 105, an objective lens actuator 106, a cylindrical lens 108, a hologram element 150, a metal holder 112, a photodetector 220, an FPC board 126 and a metal radiator plate 127.

The semiconductor laser 101 emits a luminous flux having an oscillation wavelength of approximately 405 nm. The hologram element 150 is disposed between the beam splitter 103 and the cylindrical lens 108, and divides the luminous flux for generating a tracking error signal based on the so-called 1 beam method (APP method). The hologram element 150 is disposed between the objective lens 105 and the cylindrical lens 108, and divides the reflected luminous flux reflected by the optical disk 21.

The luminous flux emitted from the semiconductor laser 101 is reflected by the beam splitter 103, thereafter converted into a parallel luminous flux by the collimator lens 104, and then enters the objective lens 105. The objective lens 105 focuses the luminous flux emitted from the semiconductor laser 101 on the optical disk 21. The objective lens 105 is driven by the objective lens actuator 106 (details not shown) in the optical axis direction (focus direction) and the tracking direction (radial direction) of the optical disk 21.

The luminous flux that has been reflected and diffracted by the recording layer of the optical disk 21 is once again transmitted through the objective lens 105 and the collimator lens 104, and then enters the beam splitter 103. The luminous flux transmitted through the beam splitter 103 is divided into a plurality of luminous fluxes by the hologram element 150, and then enters the cylindrical lens 108. The cylindrical lens 108 generates astigmatism in the reflected luminous flux reflected by the optical disk 21. The luminous flux transmitted through the cylindrical lens 108 enters the photodetector 220. The photodetector 220 detects the reflected luminous flux in which the astigmatism was generated by the cylindrical lens 108.

Figure 20:
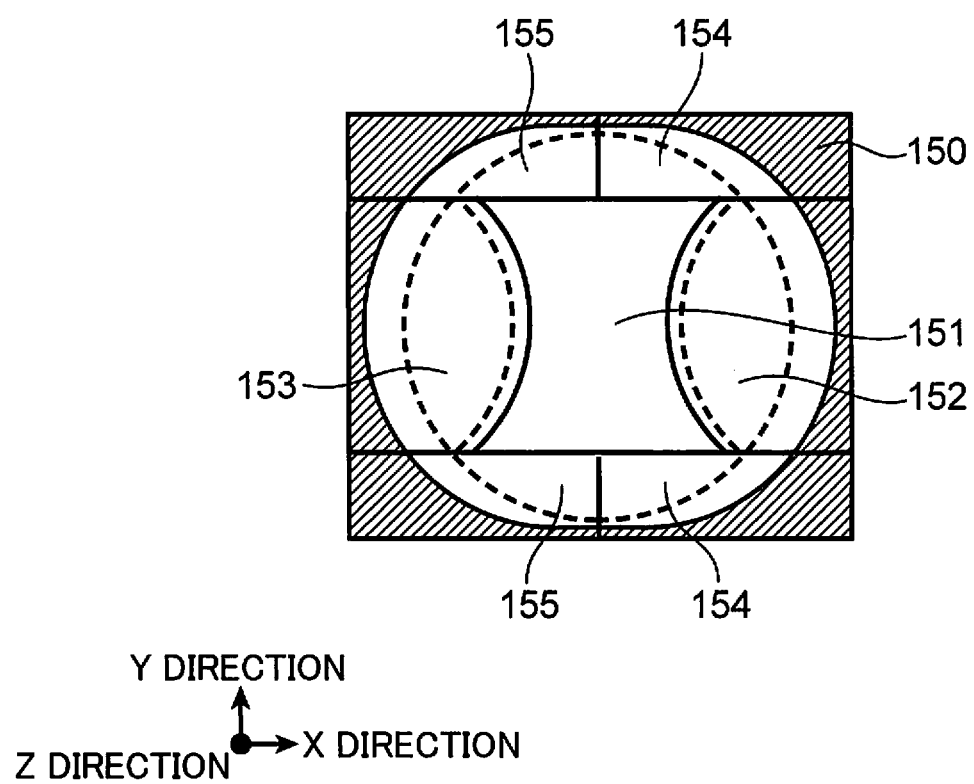
FIG. 20 is a diagram showing the configuration of the hologram element shown in FIG. 19.

FIG. 20 is a diagram showing the configuration of the hologram element 150 shown in FIG. 19. In FIG. 20, the solid lines show the divided pattern of the hologram element 150, and the broken lines show the shape of the luminous flux that passes through the hologram element 150. The hologram element 150 includes a main beam region 151 to which the main beam enters, first and second APP main regions 152 and 153 to which interfering light of ±1st order light and 0th order light which were diffracted by the recording layer of the optical disk 21 (31) enter, and first and second APP sub regions 154 and 155 to only the 0th order light enters.

Figure 21A:
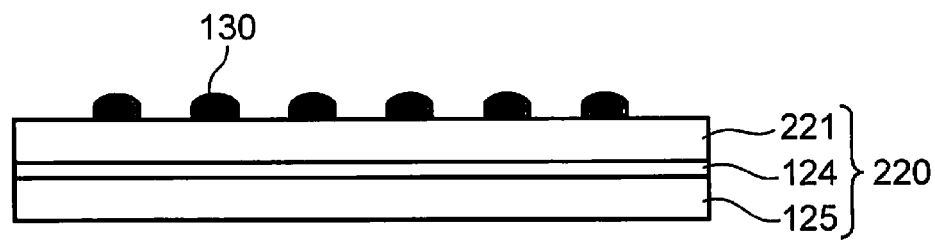
FIG. 21A is a side view showing the configuration of the photodetector in Embodiment 3 of the present invention.
Figure 21B:
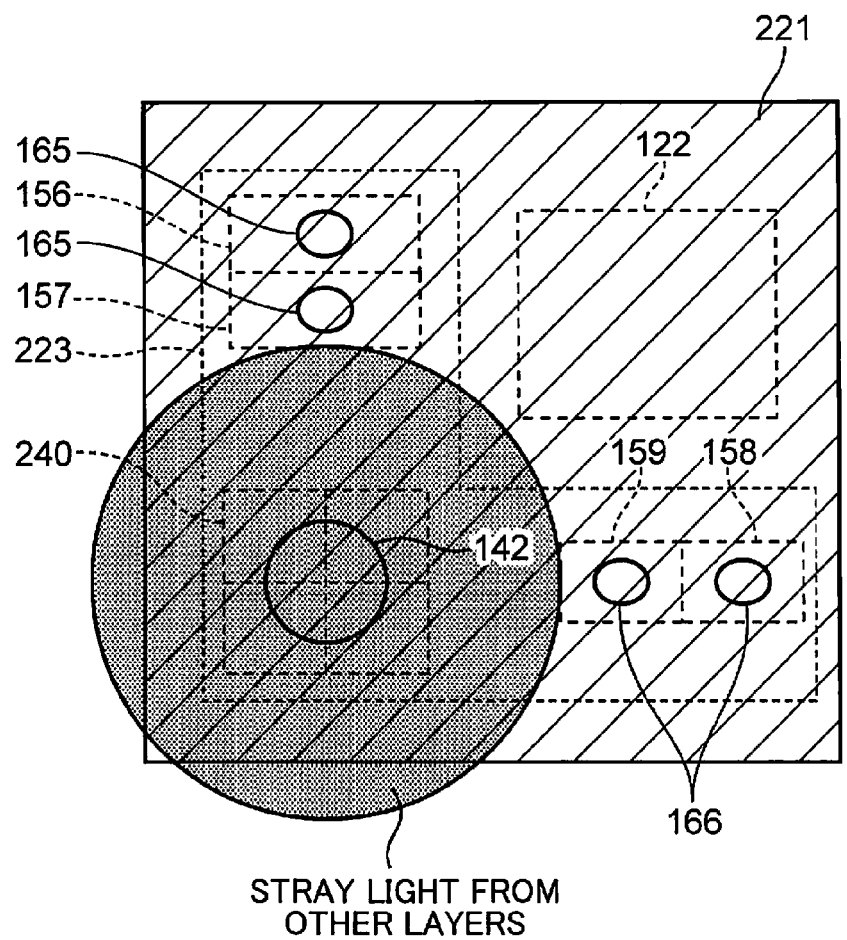
FIG. 21B is a front view showing the configuration of the photodetector in Embodiment 3 of the present invention.

FIG. 21A is a side view showing the configuration of the photodetector in Embodiment 3 of the present invention, and FIG. 21B is a front view showing the configuration of the photodetector in Embodiment 3 of the present invention. In FIG. 21A, the photodetector 220 comprises a silicon semiconductor 221, a heat transfer adhesion layer 124, a package 125 and a signal output unit 130. The silicon semiconductor 221 comprises a light receiving part 223 and an operation circuit 122. Note that the diagonal lines in FIG. 21B show the region where the heat transfer adhesion layer 124 is formed.

The light receiving part 223, the operation circuit 122 and the signal output unit 130 are formed on the silicon semiconductor 221, and the package 125 made of glass is bonded on the silicon semiconductor 221 via the heat transfer adhesion layer 124. The light receiving part 223 and the operation circuit 122 are formed on the face on the light entry side of the silicon semiconductor 221, and the signal output unit 130 is formed on a face that is opposite to the face on the light entry side. The heat transfer adhesion layer 124 is formed in a region that is on the light receiving part 223 and includes a light path through which the luminous flux reflected by the optical disk 21 passes. The configuration of the photodetector 220 other than the light receiving part 223 is the same as the configuration of the photodetector 120 of Embodiment 1.

The light receiving part 223 receives the reflected luminous flux reflected by the optical disk 21. The operation circuit 122 performs a predetermined operation on an electrical signal obtained by subjecting the reflected luminous flux received by the light receiving part 223 to photoelectric conversion. The package 125 covers the light receiving part 223 and the operation circuit 122.

The light receiving part 223 includes a quartered light receiving region 240, a first APP main beam light receiving region 156, a second APP main beam light receiving region 157, a first APP sub beam light receiving region 158 and a second APP sub beam light receiving region 159.

The luminous fluxes that were transmitted through the respective divided regions of the hologram element 150 enter their respective light receiving regions. The luminous flux (main beam 142) transmitted through the main beam region 151 enters the quartered light receiving region 240. The luminous flux (APP main beam 165) transmitted through the first and second APP main regions 152 and 153 enter the first APP main beam light receiving region 156 and the second APP main beam light receiving region 157. The luminous flux (APP sub beam 166) transmitted through the first and second APP sub regions 154 and 155 enters the first APP sub beam light receiving region 158 and the second APP sub beam light receiving region 159.

The focus error signal is generated by operating the differential of the diagonal sum signal of the quartered light receiving region 240, and the RF signal is generated by operating the sum of all signals of the quartered light receiving region 240.

Meanwhile, the so-called push-pull signal is generated by obtaining the differential of the mutual signals of the first and second APP main beam light receiving regions 156, 157, and the tracking error signal in the so-called APP method is generated by operating the generated push-pull signal and the signals of the first and second APP sub beam light receiving regions 158, 159.

Figure 22:
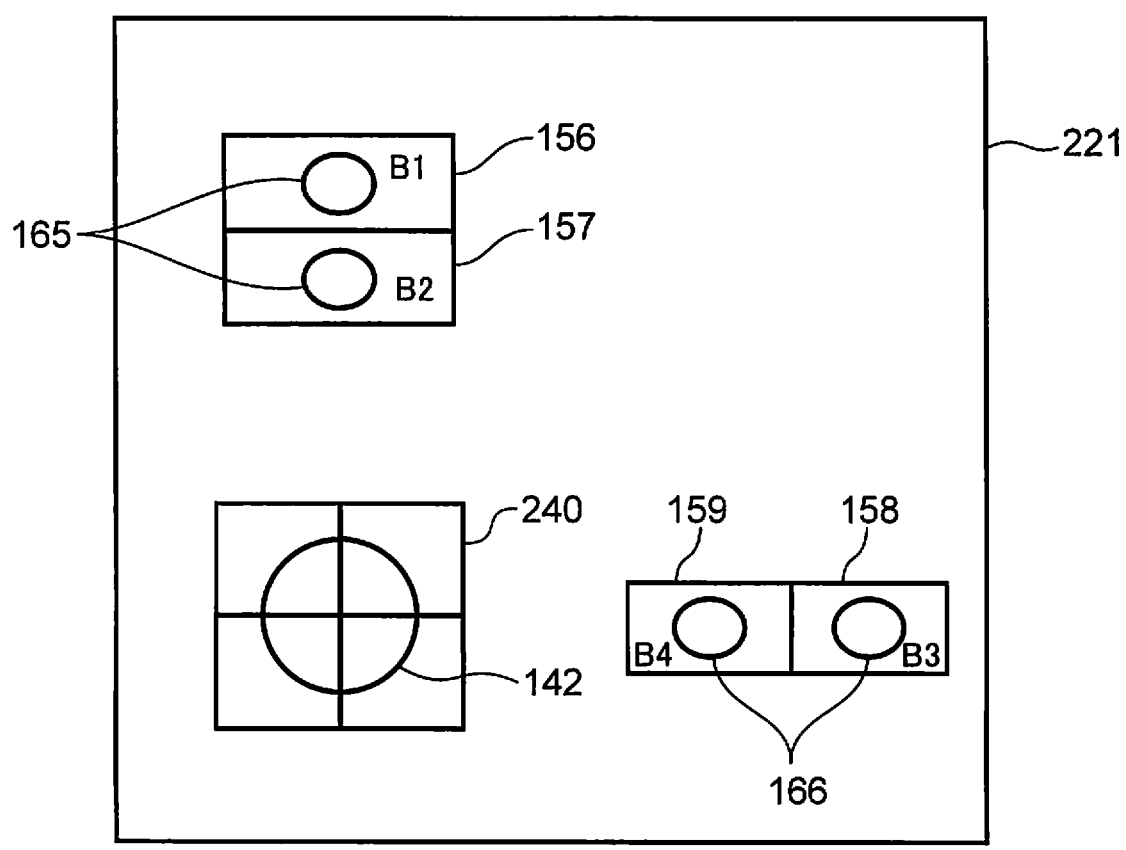
FIG. 22 is a diagram explaining the operation method of the tracking error signal in Embodiment 3 of the present invention.

Here, the quartered light receiving region 240, the first and second APP main beam light receiving regions 156, 157 and the first and second APP sub beam light receiving regions 158, 159 are arranged to be mutually distanced from each other so that stray light from other layers do not enter the first and second APP main beam light receiving regions 156, 157 and the first and second APP sub beam light receiving regions 158, 159 as the light receiving regions for generating the tracking error signal. Moreover, in order to achieve a thinner optical head 13, the respective light receiving regions are arranged in an L-shape. Here, the optical axis center becomes the center of the quartered light receiving region 240. FIG. 22 is a diagram explaining the operation method of the tracking error signal in Embodiment 3 of the present invention.

In Embodiment 3, the tracking error signal is calculated based on following Formula (3).

$$\text{Tracking error signal} = (B1-B2)-k(B3-B4) \quad (3)$$

Note that, in foregoing Formula (3), B1 represents the output of the first APP main beam light receiving region 156, B2 represents the output of the second APP main beam light receiving region 157, B3 represents the output of the first APP sub beam light receiving region 158, B4 represents the output of the second APP sub beam light receiving region 159, and k represents the gain. Note that the gain k is usually set to a value of 0.5 to 5.

According to the foregoing configuration, even in an optical head in which the tracking error signal is detected by the APP method, the tracking error signal becomes a servo signal that is not affected by the interference caused by the stray light from other layers, and it is possible to realize an optical head having stable recording performance and reproduction performance.

Note that the optical head 13 in Embodiment 3 may also comprise the metal cover 128 described in Embodiment 2. Moreover, in Embodiment 3, although the photodetector 220 is fixed to the metal holder 112, the present invention is not limited thereto, and the metal holder 112 can be omitted, and the configuration may be such that the photodetector 220 is directly bonded and fixed to the optical base.

Embodiment 4

The optical head in Embodiment 4 of the present invention is now explained. The difference with Embodiments 1 to 3 is that, in addition to the BD (Blu-ray Disc) light source which emits light having a wavelength of 405 nm, mounted are a DVD light source which emits light having a wavelength of 650 nm and a CD light source which emits light having a wavelength of 780 nm, and the configuration is compatible with multilayer BD, DVD and CD.

Figure 23:
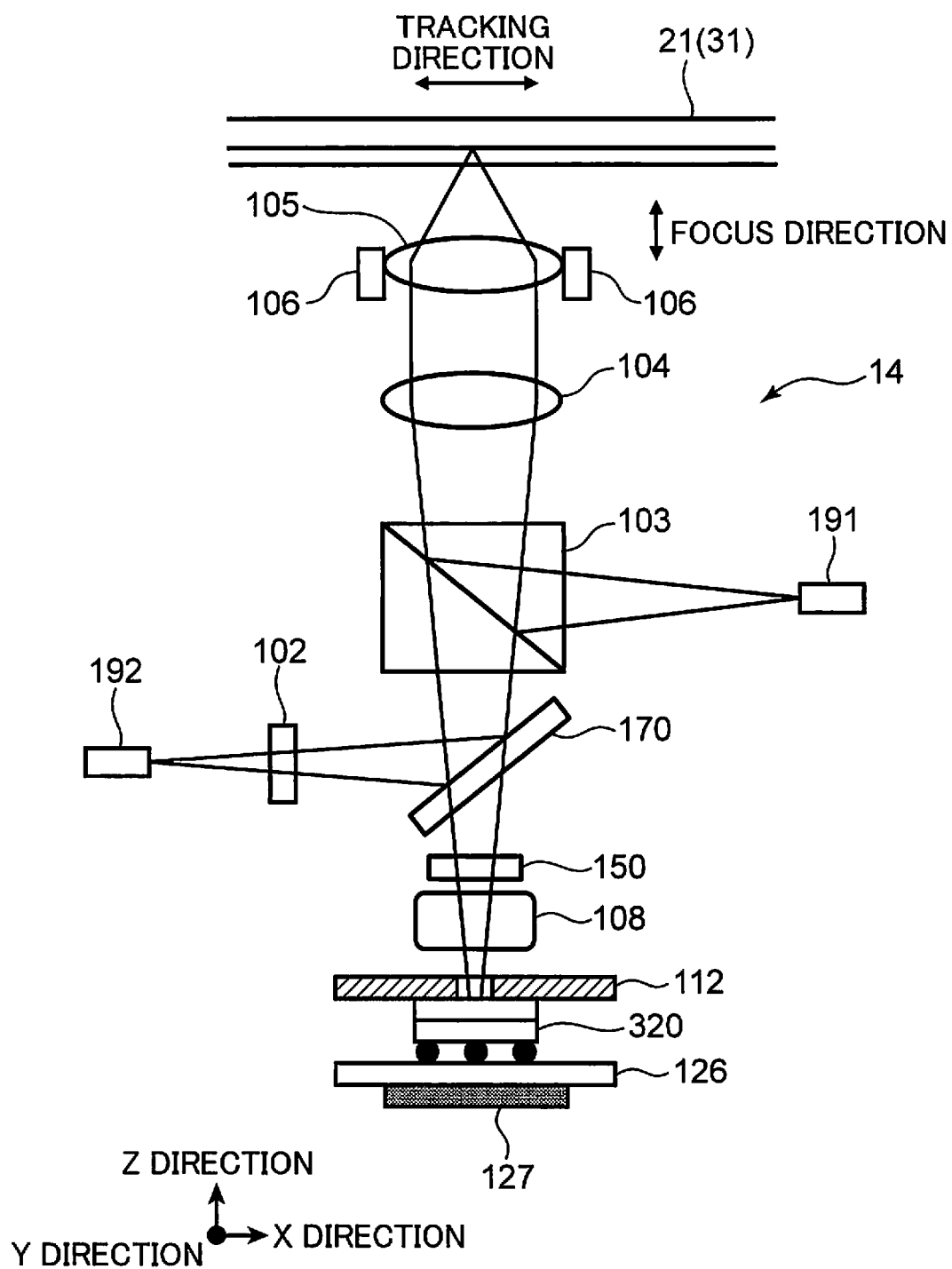
FIG. 23 is a diagram showing the configuration of the optical system of the optical head in Embodiment 4 of the present invention.

FIG. 23 is a diagram showing the configuration of the optical system of the optical head in Embodiment 4 of the present invention. In FIG. 23, the optical head 12 comprises a diffraction grating 102, a beam splitter 103, a collimator lens 104, an objective lens 105, an objective lens actuator 106, a cylindrical lens 108, a metal holder 112, a photodetector 320, an FPC board 126, a metal radiator plate 127, a hologram element 150, a flat beam splitter 170, a blue semiconductor laser 191 and a double wavelength semiconductor laser 192.

The blue semiconductor laser 191 emits blue light having a wavelength of 405 nm. The double wavelength semiconductor laser 192 emits red light having a wavelength of 650 nm, and emits infrared light having a wavelength of 780 nm.

The flat beam splitter 170 reflects the red light or infrared light emitted from the double wavelength semiconductor laser 192 toward the objective lens 105, and transmits the reflected light (blue light, red light or infrared light) reflected by the optical disk 21 (31). The photodetector 320 detects the reflected luminous flux in which the astigmatism was generated by the cylindrical lens 108.

Figure 24:
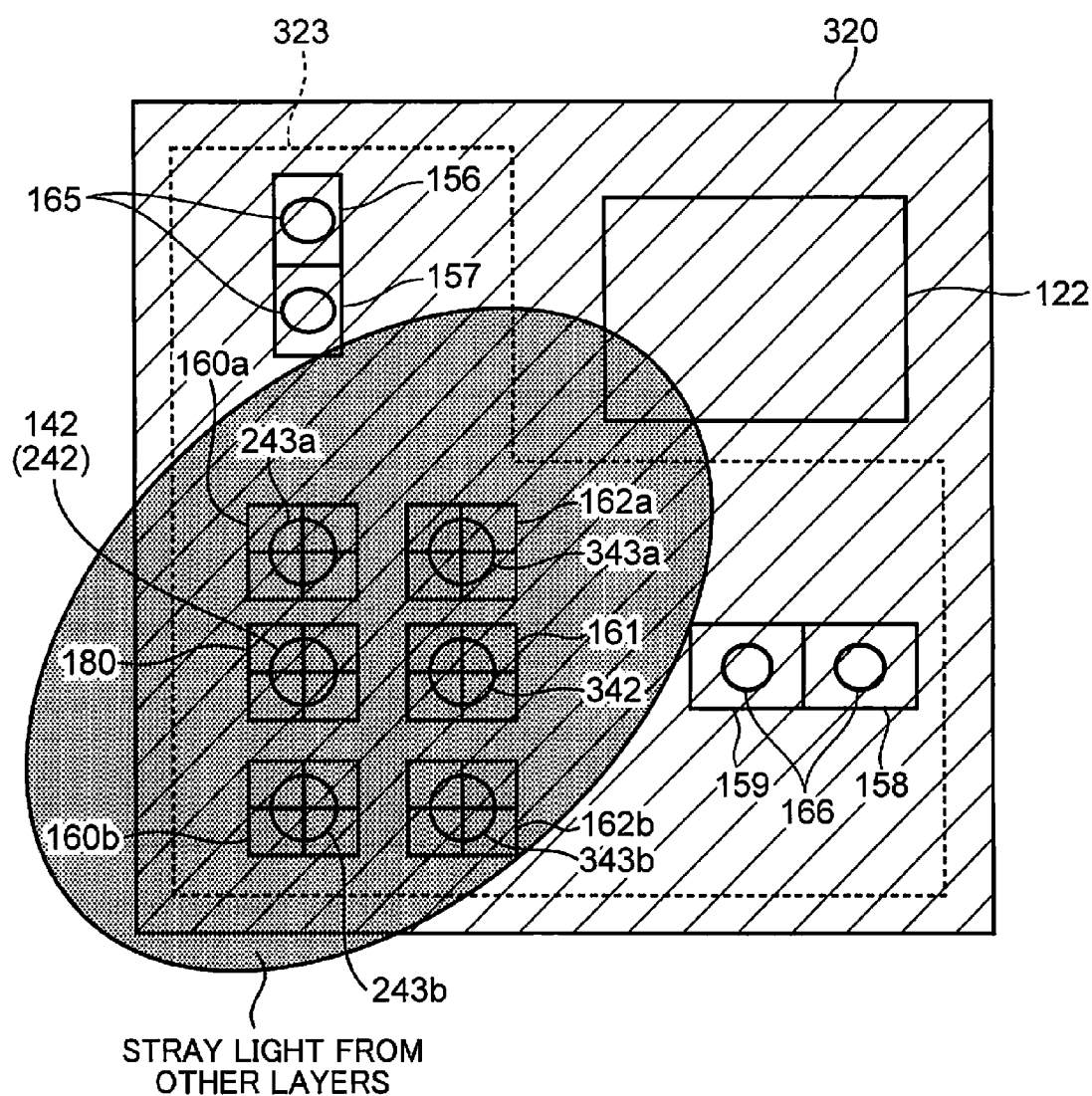
FIG. 24 is a front view showing the configuration of the photodetector in Embodiment 4 of the present invention.
Figure 25:
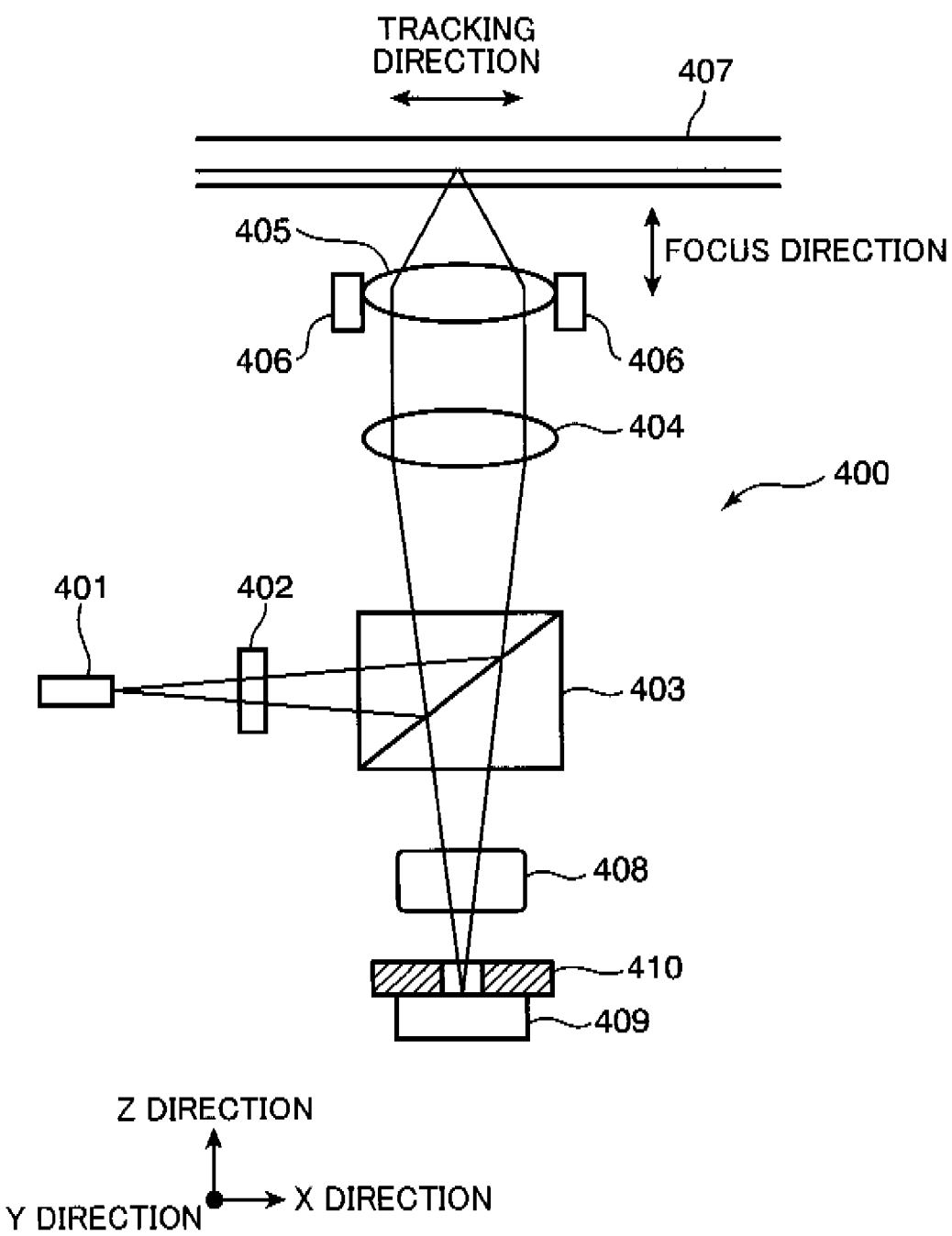
FIG. 25 is a configuration diagram of the optical system of a conventional optical head.
Figure 26:
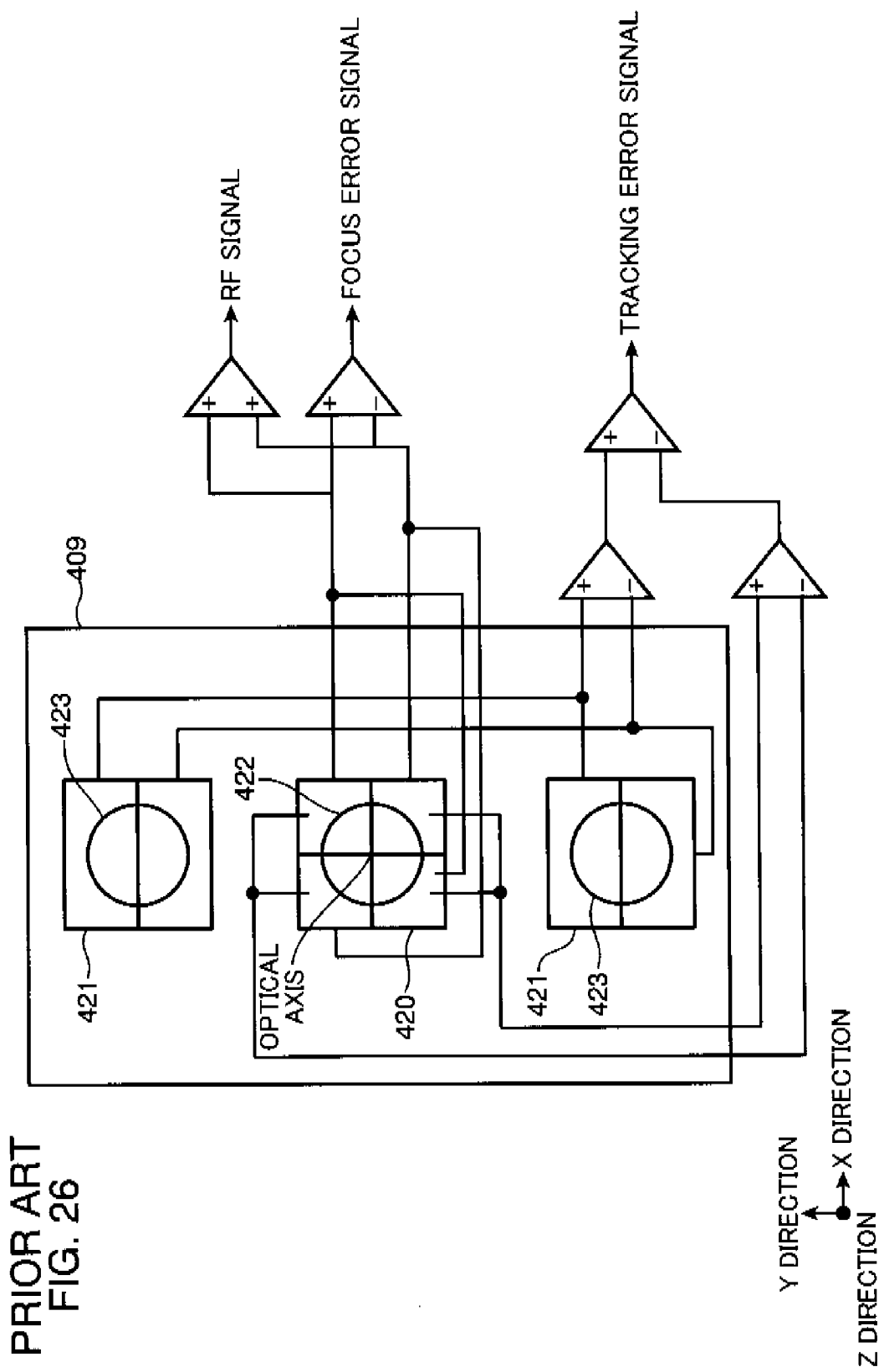
FIG. 26 is a diagram showing the arrangement of the light receiving parts on the light receiving surface of the photodetector of a conventional optical head.
Figure 27:
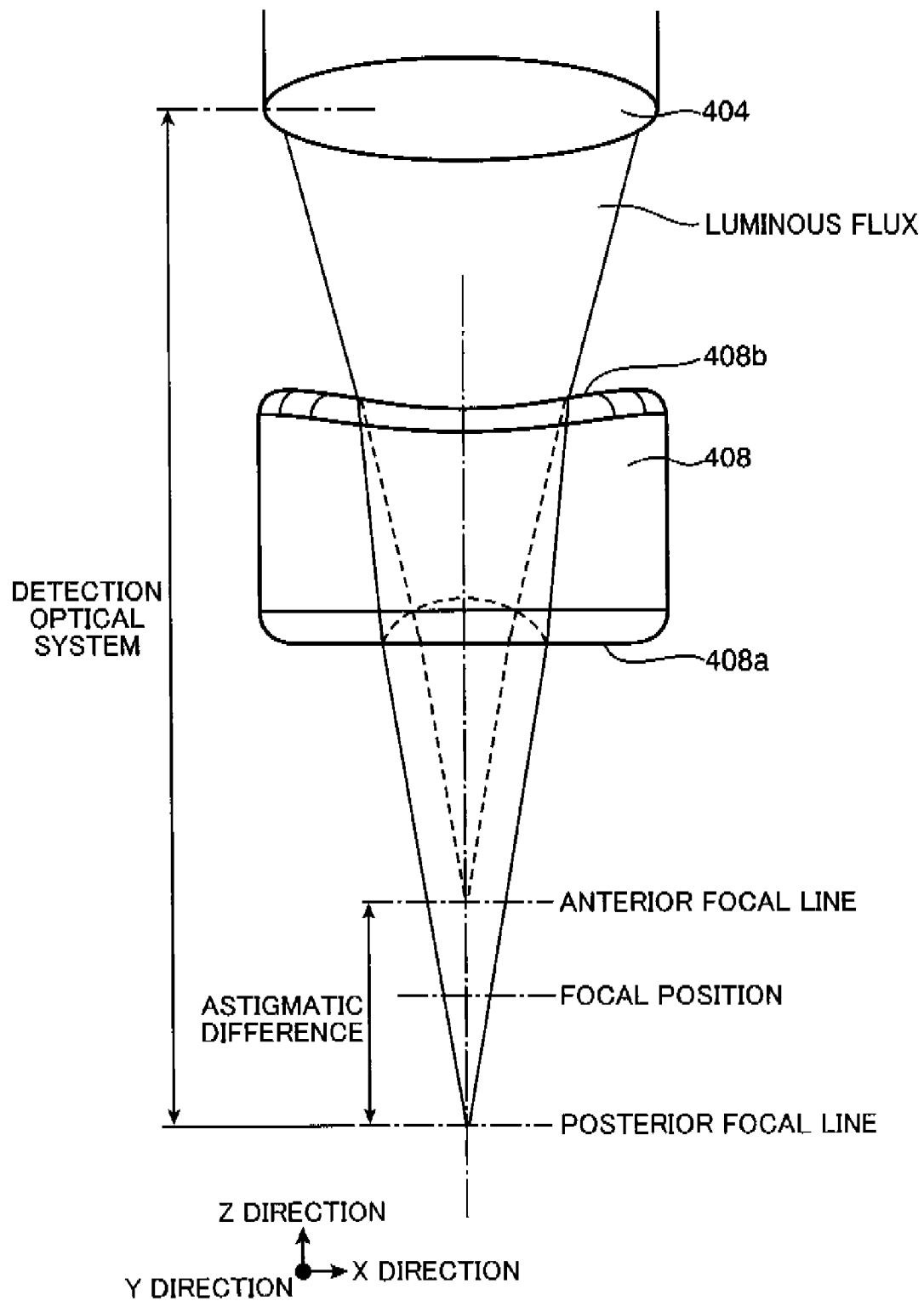
FIG. 27 is a diagram showing the detection optical system of a conventional optical head.
Figure 28:
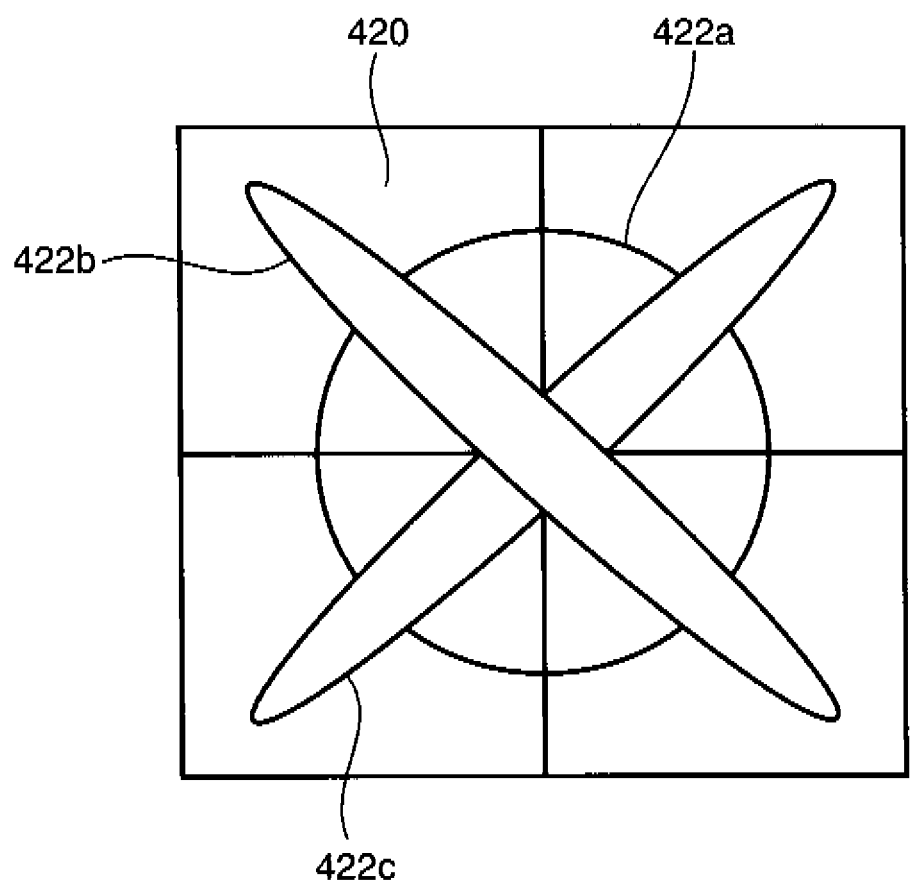
FIG. 28 is a diagram showing the luminous flux that is formed at the quartered light receiving part of the photodetector of a conventional optical head.
Figure 29A:
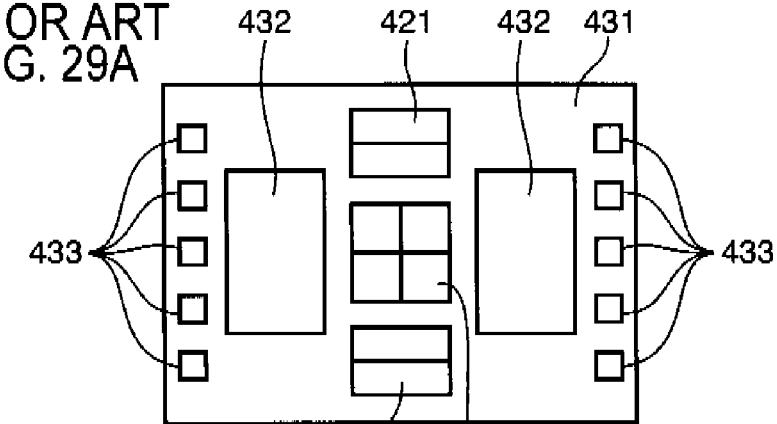
FIG. 29A is a front view showing the configuration of the photodetector of a conventional optical head.
Figure 29B:
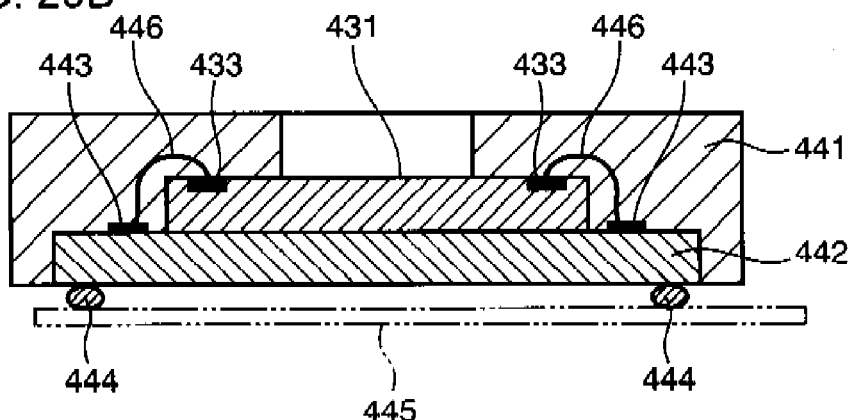
FIG. 29B is a partial cross section of the photodetector shown in FIG. 29A.
Figure 29C:
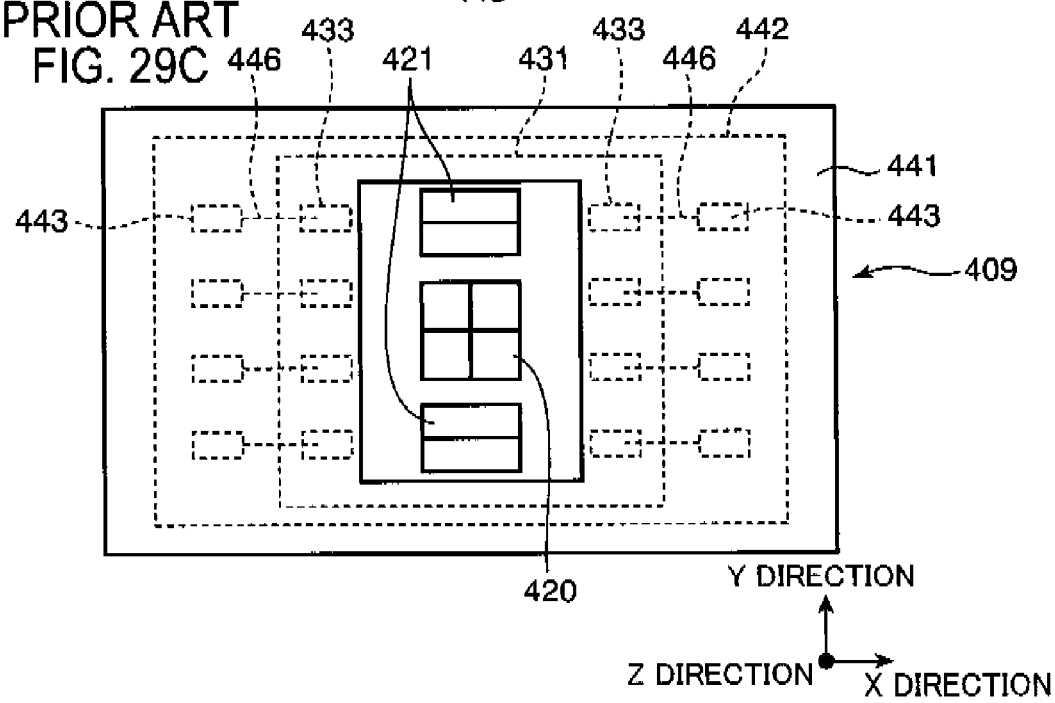
FIG. 29C is a diagram viewing the photodetector shown in FIG. 29B from above.
Figure 30:
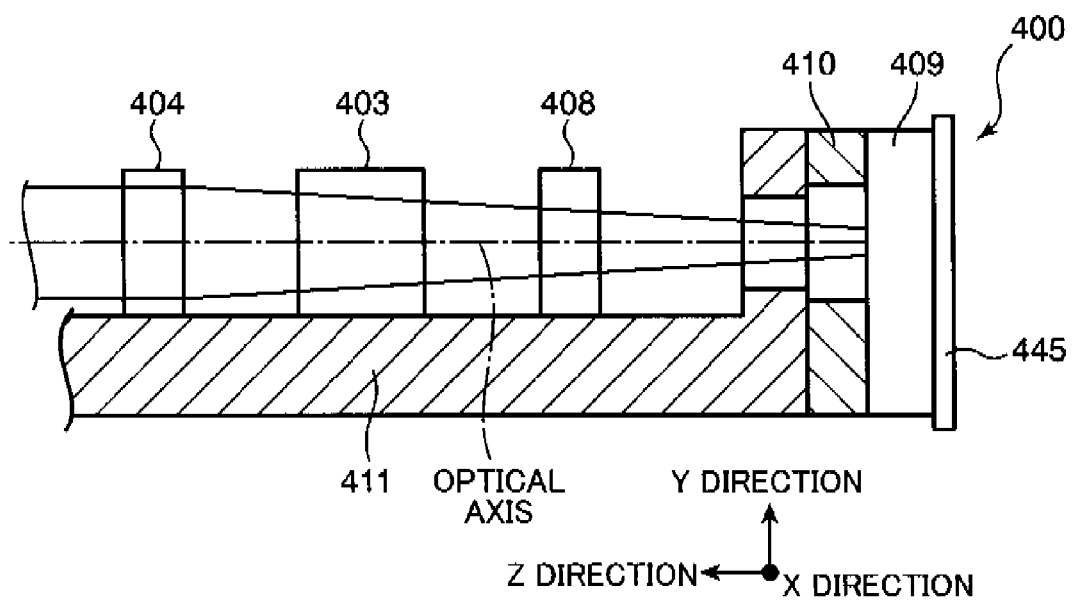
FIG. 30 is a cross section showing the configuration of the peripheral portion of the photodetector of a conventional optical head.
Figure 31:
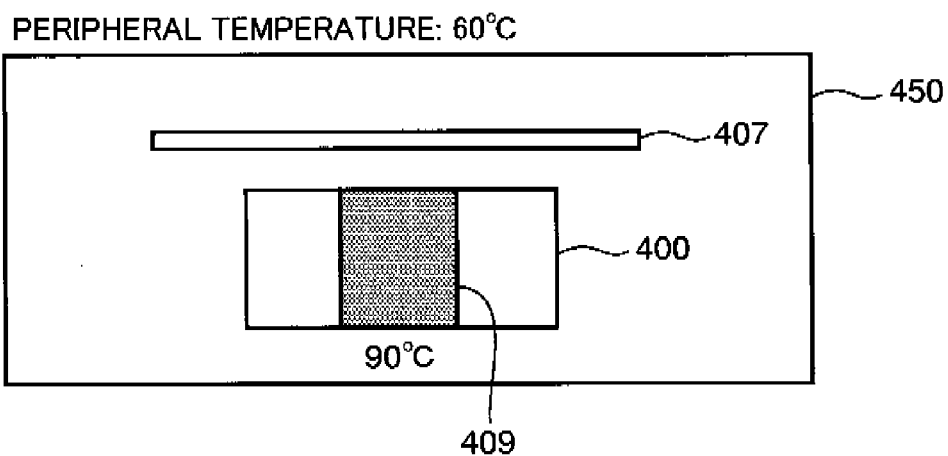
FIG. 31 is a diagram explaining the temperature rise of a conventional photodetector.
Figure 32:
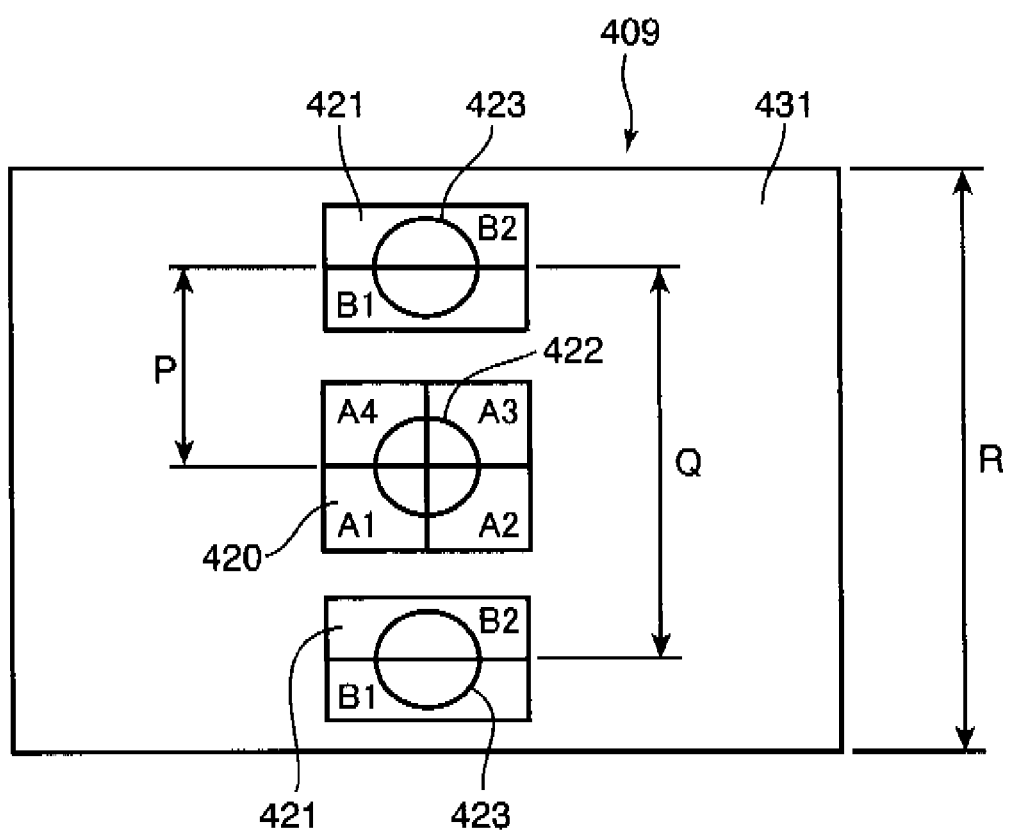
FIG. 32 is a diagram explaining the relation between the magnification of the detection optical system of a conventional optical head and the pitch of two sub beams on the photodetector.

The configuration of the photodetector 320 of the optical head 14 mounted with this kind of triple wavelength light source is now explained with reference to FIG. 24. FIG. 24 is a front view showing the configuration of the photodetector in Embodiment 4 of the present invention.

The photodetector 320 includes a light receiving part 323, an operation circuit 122, a signal output unit (not shown), a heat transfer adhesion layer (not shown) and a package (not shown). Note that the diagonal lines in FIG. 24 show the region where the heat transfer adhesion layer is formed.

The light receiving part 323, the operation circuit 122 and the signal output unit are formed on the silicon semiconductor (not shown), and the package made of glass is bonded on the silicon semiconductor via the heat transfer adhesion layer. The light receiving part 323 and the operation circuit 122 are formed on the face on the light entry side of the silicon semiconductor, and the signal output unit is formed on a face that is opposite to the face on the light entry side. The heat transfer adhesion layer is formed in a region that is on the light receiving part 323 and includes a light path through which the luminous flux reflected by the optical disk 21 passes. The configuration of the photodetector 320 other than the light receiving part 323 is the same as the configuration of the photodetector 120 of Embodiment 1.

The light receiving part 323 receives the reflected luminous flux reflected by the optical disk 21 (31). The operation circuit 122 performs a predetermined operation on an electrical signal obtained by subjecting the reflected luminous flux received by the light receiving part 323 to photoelectric conversion. The package covers the light receiving part 323 and the operation circuit 122.

The light receiving part 323 includes a first quartered light receiving region 180, a second quartered light receiving region 161, a first APP main beam light receiving region 156, a second APP main beam light receiving region 157, a first APP sub beam light receiving region 158, a second APP sub beam light receiving region 159, a first sub beam light receiving region 160a, a second sub beam light receiving region 160b, a third sub beam light receiving region 162a and a fourth sub beam light receiving region 162b.

The first quartered light receiving region 180 receives a main beam 142 of blue light having a wavelength of 405 nm, and a main beam 242 of red light having a wavelength of 650 nm. The first and second APP main beam light receiving regions 156, 157 receive an APP main beam 165 of blue light having a wavelength of 405 nm. The first and second APP sub beam light receiving regions 158, 159 receive an APP sub beam 166 of blue light having a wavelength of 405 nm.

The first sub beam light receiving region 160a receives a first sub beam 243a of red light having a wavelength of 650 nm, and the second sub beam light receiving region 160b receives a second sub beam 243b of red light having a wavelength of 650 nm. The focus error signal is detected based on the main beam 242, and the tracking error signal in the so-called 3-beam method is detected based on the push-pull signal of the main beam 242 and the signals of the first sub beam 243a and the second sub beam 243b.

In addition, the second quartered light receiving region 161 receives a main beam 342 of infrared light having a wavelength of 780 nm. The third sub beam light receiving region 162a receives a first sub beam 343a of infrared light having a wavelength of 780 nm, and the fourth sub beam light receiving region 162b receives a second sub beam 343b of infrared light having a wavelength of 780 nm. The focus error signal is detected based on the main beam 342, and the tracking error signal in the so-called 3-beam method is detected based on the push-pull signal of the main beam 342 and the signals of the first sub beam 343a and the second sub beam 343b.

Based on the configuration of Embodiment 4, it is possible to record or reproduce information to or from optical disks (BD, DVD and CD) corresponding to three different wavelengths, and, in addition single layer and dual-layer optical disks, it is possible to record and reproduce information to or from a multilayer optical disk 31, and realize a compact optical head and an optical disk drive that have superior recording characteristics and reproduction characteristics.

Note that, although the method of detecting the BD tracking error signal in Embodiment 4 is a 1 beam method (APP method), the 3-beam method may also be used. Moreover, the heat transfer adhesion layer is configured on the entire surface of the silicon semiconductor.

Moreover, the optical head 14 in Embodiment 4 may also comprise the metal cover 128 described in Embodiment 2. Moreover, in Embodiment 4, although the photodetector 320 is fixed to the metal holder 112, the present invention is not limited thereto, and the metal holder 112 can be omitted, and the configuration may be such that the photodetector 320 is directly bonded and fixed to the optical base.

Note that the specific embodiments described above mainly include the invention configured as described below.

The optical head according to one aspect of the present invention is an optical head which records or reproduces information to or from an information recording medium having a recording layer, comprising a light source which emits a luminous flux, an objective lens which focuses the luminous flux emitted from the light source on the information recording medium, and a photodetector which detects the luminous flux reflected by the information recording medium, the photodetector includes a light receiving part which receives the luminous flux reflected by the information recording medium, a package member which covers the light receiving part, and an adhesion layer which bonds the package member and the light receiving part, and the adhesion layer is formed in a region that is on the light receiving part and includes a light path through which the luminous flux reflected by the information recording medium passes.

According to the foregoing configuration, the light source emits a luminous flux. The objective lens focuses the luminous flux emitted from the light source on the information recording medium. The photodetector detects the luminous flux reflected by the information recording medium. The light receiving part receives the luminous flux reflected by the information recording medium. The package member covers the light receiving part. The adhesion layer bonds the package member and the light receiving part. The adhesion layer is formed in a region that is on the light receiving part and includes a light path through which the luminous flux reflected by the information recording medium passes.

Accordingly, since the heat generated from the photodetector is transferred to the adhesion layer, it is possible to inhibit the temperature rise of the photodetector and realize the downsizing of the optical head and the stabilization of the detection signal.

Moreover, with the foregoing optical head, preferably, the package member is formed in a region that includes a light path through which the luminous flux reflected by the information recording medium passes.

According to the foregoing configuration, the package member is formed in a region that includes a light path through which the luminous flux reflected by the information recording medium passes. Accordingly, since the heat generated from the photodetector is transferred to the package member via the adhesion layer, it is possible to further inhibit the temperature rise of the photodetector.

Moreover, with the foregoing optical head, preferably, the adhesion layer is made of silicon resin, and the thickness of the adhesion layer is between 5 µm and 25 µm.

According to the foregoing configuration, the adhesion layer is made of silicon resin. Moreover, the thickness of the adhesion layer is between 5 µm and 25 µm. Accordingly, it is possible to reduce the thermal resistance while maintaining the adhesive strength. Moreover, it is possible to inhibit the degradation of the quality of material caused by the blue light having a wavelength of 405 nm and increase the transmittance of the adhesion layer.

Moreover, with the foregoing optical head, preferably, the coefficient of thermal conductivity of the adhesion layer is 0.5 W/m·K or more.

According to the foregoing configuration, since the coefficient of thermal conductivity of the adhesion layer is 0.5 W/m·K or more, it is possible to increase the coefficient of thermal conductivity from the light receiving part to the package member.

Moreover, with the foregoing optical head, preferably, the adhesion layer does not contain an epoxy-based compound.

According to the foregoing configuration, since the adhesion layer does not include an epoxy-based compound, it is possible to considerably decrease the degradation of the silicon resin caused by the blue light.

Moreover, with the foregoing optical head, preferably, an antireflection film is formed on a face of the package member where the luminous flux reflected by the information recording medium enters, and an antireflection film is not formed on a boundary surface of the package member and the adhesion layer.

According to the foregoing configuration, it is possible to increase the adhesive strength of the package member and the adhesion layer. Moreover, it is possible to realize superior reliability and S/N ratio without compromising the transmittance even without an antireflection film at the boundary surface of the package member and the adhesion layer.

Moreover, with the foregoing optical head, preferably, the transmittance of the adhesion layer is 99% or higher relative to light having a wavelength of 405 nm.

According to the foregoing configuration, since the transmittance of the adhesion layer is 99% or higher relative to light having a wavelength of 405 nm, it is possible to guide the light having a wavelength of 405 nm to the light receiving part.

Moreover, with the foregoing optical head, preferably, the photodetector further includes an operation part for performing a predetermined operation on an electrical signal obtained by subjecting the luminous flux received by the light receiving part to photoelectric conversion, and a signal output unit which is connected to the operation part and outputs an output signal from the operation part, and the optical head further comprises a printed circuit board which is disposed on a side that is far from the objective lens of the photodetector and connected to the signal output unit.

According to the foregoing configuration, the operation part performs a predetermined operation on an electrical signal obtained by subjecting the luminous flux received by the light receiving part to photoelectric conversion. The signal output unit is connected to the operation part, and outputs an output signal from the operation part. Moreover, the printed circuit board is disposed on a side that is far from the objective lens of the photodetector and connected to the signal output unit.

Accordingly, since the heat generated by the photodetector is transferred to the printed circuit board via the signal output unit, it is possible to further inhibit the temperature rise of the photodetector.

Moreover, preferably, the foregoing optical head further comprises a radiator plate that is in contact with a face opposite to a face, of the printed circuit board, to which the signal output unit is connected, and that radiates heat transferred from the printed circuit board.

According to the foregoing configuration, the radiator plate is in contact with a face opposite to a face, of the printed circuit board, to which the signal output unit is connected, and radiates heat transferred from the printed circuit board.

Accordingly, since the heat generated by the photodetector is transferred to the radiator plate via the signal output unit and the printed circuit board, it is possible to further inhibit the temperature rise of the photodetector.

Moreover, with the foregoing optical head, preferably, the radiator plate is disposed at a position where wind, which is generated by rotation of the information recording medium, directly comes in contact with a surface of the radiator plate, and the wind from the information recording medium passes over the surface of the radiator plate.

According to the foregoing configuration, the radiator plate is disposed at a position where wind, which is generated by rotation of the information recording medium, directly comes in contact with a surface of the radiator plate. In addition, the wind from the information recording medium passes over the surface of the radiator plate. Accordingly, it is possible to cool the radiator plate with the wind that is generated by rotation of the information recording medium, and further inhibit the temperature rise of the photodetector.

Moreover, preferably, the foregoing optical head further comprises an optical base which fixes an optical member disposed on the light path of the luminous flux emitted from the light source, and the printed circuit board and the radiator plate are protruding toward the information recording medium relative to a top face of the optical base.

According to the foregoing configuration, the optical base fixes an optical member disposed on the light path of the luminous flux emitted from the light source. The printed circuit board and the radiator plate are protruding toward the information recording medium relative to a top face of the optical base. Accordingly, since the area where the wind that is generated by rotation of the information recording medium comes in contact with the printed circuit board and the radiator plate will increase, it is possible to further inhibit the temperature rise of the photodetector.

Moreover, with the foregoing optical head, preferably, the printed circuit board includes via holes which transfer heat that is generated in the light receiving part and the operation part from the signal output unit to the radiator plate, and the ratio of distribution of the via holes relative to a surface area of the operation part is higher than the ratio of distribution of the via holes relative to a surface area of the light receiving part.

According to the foregoing configuration, the via holes transfer heat that is generated in the light receiving part and the operation part from the signal output unit to the radiator plate. In addition, the ratio of distribution of the via holes relative to a surface area of the operation part is higher than the ratio of distribution of the via holes relative to a surface area of the light receiving part. Accordingly, it is possible to effectively radiate the heat that is generated in the operation part with a considerable amount of heat generation.

Moreover, preferably, the foregoing optical head further comprises a cover member which is fixed to the optical base and to which heat from the radiator plate is transferred, the cover member is disposed at a position where wind, which is generated by rotation of the information recording medium, directly comes in contact therewith, and the wind from the information recording medium passes over a surface of the cover member.

According to the foregoing configuration, the cover member is fixed to the optical base and heat from the radiator plate is transferred thereto. In addition, the cover member is disposed at a position where wind, which is generated by rotation of the information recording medium, directly comes in contact therewith, and the wind from the information recording medium passes over the surface of the cover member.

Accordingly, since the heated generated in the photodetector is transferred to the cover member via the signal output unit, the printed circuit board and the radiator plate, it is possible to further inhibit the temperature rise of the photodetector. Moreover, it is possible to cool the cover member with the wind that is generated by rotation of the information recording medium, and further inhibit the temperature rise of the photodetector.

Moreover, with the foregoing optical head, preferably, the cover member is inclined obliquely relative to a face that is perpendicular to an optical axis of the luminous flux that enters the photodetector, and an edge of the cover member on the information recording medium side broadens in a direction that recedes from the metal radiator plate.

According to the foregoing configuration, since the cover member is inclined obliquely relative to a face that is perpendicular to an optical axis of the luminous flux that enters the photodetector, and an edge of the cover member on the information recording medium side broadens in a direction that recedes from the metal radiator plate, it is possible to increase the radiation efficiency based on a configuration in which more wind passes on the surface of the cover member.

Moreover, preferably, the foregoing optical head further comprises an optical base which fixes an optical member disposed on the light path of the luminous flux emitted from the light source and the photodetector, a luminous flux entry hole for guiding the luminous flux to the photodetector is formed at a portion of the optical base where the photodetector is fixed, the photodetector is smaller than the luminous flux entry hole, and wind from the information recording medium passes through the luminous flux entry hole.

According to the foregoing configuration, the optical base fixes an optical member disposed on the light path of the luminous flux emitted from the light source and the photodetector. In addition, a luminous flux entry hole for guiding the luminous flux to the photodetector is formed at a portion of the optical base where the photodetector is fixed. The photodetector is smaller than the luminous flux entry hole, and the wind from the information recording medium passes through the luminous flux entry hole.

Accordingly, it is possible to radiate the photodetector with the wind that passes through the luminous flux entry, and further inhibit the temperature rise of the photodetector.

Moreover, preferably, the foregoing optical head further comprises an optical base which fixes an optical member disposed on the light path of the luminous flux emitted from the light source, and a holder which is fixed to the optical base and holds the photodetector, a luminous flux entry hole for guiding the luminous flux to the photodetector is formed at a portion of the optical base where the holder is fixed, the holder is smaller than the luminous flux entry hole, and wind from the information recording medium passes through the luminous flux entry hole.

According to the foregoing configuration, the optical base fixes an optical member disposed on the light path of the luminous flux emitted from the light source. Moreover, the holder is fixed to the optical base and holds the photodetector. A luminous flux entry hole for guiding the luminous flux to the photodetector is formed at a portion of the optical base where the holder is fixed. The holder is smaller than the luminous flux entry hole, and the wind from the information recording medium passes through the luminous flux entry hole.

Accordingly, since the heat that is generated in the photodetector is transferred to the holder, it is possible to further inhibit the temperature rise of the photodetector. Moreover, it is possible to radiate the holder with the wind that passes through the luminous flux entry hole, and further inhibit the temperature rise of the photodetector.

Moreover, with the foregoing optical head, preferably, the photodetector is disposed at a position where wind, which is generated by rotation of the information recording medium, directly comes in contact therewith.

According to the foregoing configuration, since the photodetector is disposed at a position where wind, which is generated by rotation of the information recording medium, directly comes in contact therewith, it is possible to increase the radiation efficiency of the photodetector.

The optical information device according to another aspect of the present invention comprises any one of the foregoing optical heads, a drive part which rotationally drives an information recording medium, and a control unit which controls the optical head and the drive part. According to the foregoing configuration, the foregoing optical head can be applied to an optical information device.

Note that the specific embodiments and examples described in the section of Description of Embodiments are merely for clarifying the technical content of the present invention, and the present invention should not be interpreted narrowly by being limited to such specific embodiments and examples. The present invention can be modified variously and implemented within the scope of the spirit and claims of the present invention.

INDUSTRIAL APPLICABILITY

The optical head and optical information device according to the present invention can realize stable tracking control performance and low information error rate, realize the recording or reproduction of information to or from a multi-layer information recording medium, and is useful as an external storage device or the like of a computer having stable recording performance and reproduction performance. Moreover, the optical head and optical information device according to the present invention can be applied to visual recording devices such as a DVD recorder, a BD recorder or an HD-DVD recorder, and to visual reproduction devices such as a DVD player, a BD player or an HD-DVD player. In addition, the optical head and optical information device according to the present invention can also be applied to the storage devices of a car navigation system, a portable music player, a digital still camera or a digital video camera.

The invention claimed is:

1. An optical head which records or reproduces information to or from an information recording medium having a recording layer, comprising:
a light source which emits a luminous flux;
an objective lens which focuses the luminous flux emitted from the light source on the information recording medium; and
a photodetector which detects the luminous flux reflected by the information recording medium,
wherein the photodetector includes:
a light receiving part which receives the luminous flux reflected by the information recording medium;
a package member which covers the light receiving part; and
an adhesion layer which bonds the package member and the light receiving part, and
wherein the adhesion layer is formed in a region that is on the light receiving part and includes a light path through which the luminous flux reflected by the information recording medium passes,
the adhesion layer is made of silicon resin, and
the thickness of the adhesion layer is between 5 µm and 25 µm.

2. The optical head according to claim 1,
wherein the package member is formed in a region that includes a light path through which the luminous flux reflected by the information recording medium passes.

3. An optical head which records or reproduces information to or from an information recording medium having a recording layer, comprising:
a light source which emits a luminous flux;
an objective lens which focuses the luminous flux emitted from the light source on the information recording medium; and
a photodetector which detects the luminous flux reflected by the information recording medium,
wherein the photodetector includes:
a light receiving part which receives the luminous flux reflected by the information recording medium;
a package member which covers the light receiving part; and
an adhesion layer which bonds the package member and the light receiving part, and
wherein the adhesion layer is formed in a region that is on the light receiving part and includes a light path through which the luminous flux reflected by the information recording medium passes, and
wherein a coefficient of thermal conductivity of the adhesion layer is 0.5 W/m·K or more.

4. The optical head according to claim 1,
wherein the adhesion layer does not contain an epoxy-based compound.

5. An optical head which records or reproduces information to or from an information recording medium having a recording layer, comprising:
a light source which emits a luminous flux;
an objective lens which focuses the luminous flux emitted from the light source on the information recording medium; and
a photodetector which detects the luminous flux reflected by the information recording medium,
wherein the photodetector includes:
a light receiving part which receives the luminous flux reflected by the information recording medium;
a package member which covers the light receiving part; and
an adhesion layer which bonds the package member and the light receiving part, and
wherein the adhesion layer is formed in a region that is on the light receiving part and includes a light path through which the luminous flux reflected by the information recording medium passes,
wherein an antireflection film is formed on a face of the package member where the luminous flux reflected by the information recording medium enters, and
an antireflection film is not formed on a boundary surface of the package member and the adhesion layer.

6. The optical head according to claim 1,
wherein a transmittance of the adhesion layer is 99% or higher relative to light having a wavelength of 405 nm.

7. The optical head according to claim 1,
wherein the photodetector further includes:
an operation part for performing a predetermined operation on an electrical signal obtained by subjecting the luminous flux received by the light receiving part to photoelectric conversion; and
a signal output unit which is connected to the operation part and outputs an output signal from the operation part,
the optical head further comprising:
a printed circuit board which is disposed on a side that is far from the objective lens of the photodetector and connected to the signal output unit.

8. The optical head according to claim 7, further comprising:
a radiator plate that is in contact with a face opposite to a face, of the printed circuit board, to which the signal output unit is connected, and that radiates heat transferred from the printed circuit board.

9. The optical head according to claim 8,
wherein the radiator plate is disposed at a position where wind, which is generated by rotation of the information recording medium, directly comes in contact with a surface of the radiator plate, and the wind from the information recording medium passes over the surface of the radiator plate.

10. The optical head according to claim 8, further comprising:
an optical base which fixes an optical member disposed on the light path of the luminous flux emitted from the light source,
wherein the printed circuit board and the radiator plate are protruding toward the information recording medium relative to a top face of the optical base.

11. The optical head according to claim 8,
wherein the printed circuit board includes via holes which transfer heat that is generated in the light receiving part and the operation part from the signal output unit to the radiator plate, and
wherein the ratio of distribution of the via holes relative to a surface area of the operation part is higher than the ratio of distribution of the via holes relative to a surface area of the light receiving part.

12. The optical head according to claim 8, further comprising:
a cover member which is fixed to the optical base and to which heat from the radiator plate is transferred,
wherein the cover member is disposed at a position where wind, which is generated by rotation of the information recording medium, directly comes in contact therewith, and
the wind from the information recording medium passes over a surface of the cover member.

13. The optical head according to claim 12,
wherein the cover member is inclined obliquely relative to a face that is perpendicular to an optical axis of the luminous flux that enters the photodetector, and
an edge of the cover member on the information recording medium side broadens in a direction that recedes from the radiator plate.

14. The optical head according to claim 1, further comprising:
an optical base which fixes an optical member disposed on the light path of the luminous flux emitted from the light source and the photodetector,
wherein a luminous flux entry hole for guiding the luminous flux to the photodetector is formed at a portion of the optical base where the photodetector is fixed,
the photodetector is smaller than the luminous flux entry hole, and
wind from the information recording medium passes through the luminous flux entry hole.

15. The optical head according to claim 1, further comprising:
an optical base which fixes an optical member disposed on the light path of the luminous flux emitted from the light source; and
a holder which is fixed to the optical base and holds the photodetector,
wherein a luminous flux entry hole for guiding the luminous flux to the photodetector is formed at a portion of the optical base where the holder is fixed,
the holder is smaller than the luminous flux entry hole, and
wind from the information recording medium passes through the luminous flux entry hole.

16. The optical head according to claim 1,
wherein the photodetector is disposed at a position where wind, which is generated by rotation of the information recording medium, directly comes in contact therewith.

17. An optical information device, comprising:
the optical head according to claim 1;
a drive part which rotationally drives an information recording medium; and
a control unit which controls the optical head and the drive part.

* * * * *